US010979515B1

(12) United States Patent
Simon et al.

(10) Patent No.: US 10,979,515 B1
(45) Date of Patent: *Apr. 13, 2021

(54) RESOURCE DISCOVERY AGENT COMPUTING DEVICE, SOFTWARE APPLICATION, AND METHOD

(71) Applicant: State Farm Mutual Automobile Insurance Company, Bloomington, IL (US)

(72) Inventors: Richard Simon, Bloomington, IL (US); Jeremy Lee Rambo, Bloomington, IL (US); John M. VanAntwerp, Normal, IL (US); Dan Kalmes, Bloomington, IL (US); Burton J. Floyd, Mackinaw, IL (US); Thad Garrett Craft, Heyworth, IL (US); Marc Anderson, Decatur, IL (US); Nick U. Christopulos, Bloomington, IL (US); Patrick Mead, Eurkea, IL (US); Richard Berglund, Bloomington, IL (US); Erik Donahue, Normal, IL (US); Joseph W. Norton, Normal, IL (US); Vladyslava Matviyenko, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/703,662

(22) Filed: Dec. 4, 2019

Related U.S. Application Data

(63) Continuation of application No. 15/808,575, filed on Nov. 9, 2017, now Pat. No. 10,536,536.

(Continued)

(51) Int. Cl.
*H04L 29/08* (2006.01)
*G06F 16/9535* (2019.01)

(52) U.S. Cl.
CPC .......... *H04L 67/16* (2013.01); *G06F 16/9535* (2019.01)

(58) Field of Classification Search
CPC .......................... H04L 67/16; G06F 16/9535
See application file for complete search history.

(56) References Cited

U.S. PATENT DOCUMENTS 9,652,805 B1 * 5/2017 Clawson, II ....... G06Q 30/0611
10,109,014 B1 10/2018 Bischoff et al.
(Continued)

*Primary Examiner* — Joe Chacko

(57) ABSTRACT

A computer-implemented method for retrieving information from information services and providing it to a public application programming interface (API) includes receiving a first request data message using a core discovery agent, the request data message including at least one requested datum, for which a value is sought, and at least one known datum, for which a value is known; calling a resource locator to request a location of an information service that provides a value for the requested datum; calling a resource façade to contact the information service; transmitting a first information service message including the requested datum and known datum from the resource façade to the information service; receiving a second information service message from the information service including a value for the requested datum; and transmitting a resolved data message including the requested datum and its value from the core discovery agent to the public API.

19 Claims, 18 Drawing Sheets

Related U.S. Application Data

(60) Provisional application No. 62/487,132, filed on Apr. 19, 2017, provisional application No. 62/425,286, filed on Nov. 22, 2016, provisional application No. 62/422,262, filed on Nov. 15, 2016.

(56) References Cited

U.S. PATENT DOCUMENTS

| 10,121,202 B1* | 11/2018 | Garcia | G06Q 40/08 |
|---|---|---|---|
| 2010/0223078 A1 | 9/2010 | Willis et al. | |
| 2011/0264479 A1 | 10/2011 | Birr | |
| 2016/0364804 A1 | 12/2016 | Olson | |

* cited by examiner

| Request Data Message | |
|---|---|
| Field | Description |
| Entity | The unique identifier of the request data message. The identifier correlates to the transaction identifier for the operational facts written for the given event, allowing analysts to correlate operational facts with system events. |
| Attribute | All request data message events will have an attribute specified as "hpm.request/message". |
| Transaction | The unique transaction identifier of this system event. |
| Data | The value is the actual system event containing the facts of the system necessary to derive business events.<br>originRequestDataMessage<br>    When "present" is true, then there is an origin request data message for the current message - meaning, this is not the first message in the discovery process.<br>namespace<br>    The namespace in which the system event was executed against.<br>originalRequestDatums<br>    The attributes being requested by the system event.<br>originMessage<br>    Similar to originRequestDataMessage, when true this request message represents an origin request message in the discovery process; if the value is false, then this is a support request.<br>supportMessage<br>    Similar to originRequestDataMessage, when true this request message represents a support request in the discovery process; if the value is false, then this is the origin request message. |

FIG. 4

| originalPayloadDatums |
| The set of EAVTOs, or Datums, passed in with the request for data message. These Datums represent the data used to derive information. |
| remainingRequestDatums |
| The datums remaining to be satisfied after the requested resource binding process is complete. |
| aggregatedDatums |
| The complete collection of datums after the requested resource binding process is complete. This includes both the payload and result datums. |
| timestamp |
| The exact time this message was created. |

FIG. 4 (CONT.)

```
"entity": "6ba8737d-483f-11e6-9637-3c15c2c26264"
"attribute": "hpm.request/message"
"transaction": "6bc91ade-483f-11e6-9637-3c15c2c26264"
"operation": "ADD"
"data":
  "originRequestDataMessage":
    "present": "false"
    "namespace": "sds"
  "originalRequestDatums":
    "attribute": "sds.risk/total-premium-amount"
    "attribute": "sds.agreement/total-premium-amount"
  "supportMessage": "false"
  "originalPayloadDatums":
  "requestSatisfied": "false"
  "remainingRequestDatums":
    "attribute": "sds.risk/total-premium-amount"
    "attribute": "sds.agreement/total-premium-amount"
  "aggregatedDatums":
  "originMessage": "true"
```

FIG. 5

| Resolved Data Message | |
|---|---|
| Field | Description |
| Entity | The unique identifier of the request data message. The identifier correlates to the transaction identifier for the operational facts written for the given event, allowing analysts to correlate operational facts with system events. |
| Attribute | All request data message events will have an attribute specified as "hpm.resolved/message". |
| Transaction | The unique transaction identifier of this system event. |
| | The value is the actual system event containing the facts of the system necessary to derive business events. |
| | requestDataMessage<br>The source request data message and all its corresponding data points. |
| Data | resolvedData<br>The subset of aggregated datums matching only those requested as part of the request message originalRequestDatums. |
| | timestamp<br>The exact time this message was created. |

FIG. 6

```
"entity": "6ba8737d-483f-11e6-9637-3c15c2c26264"
"attribute": ":hpm.resolved/message"
"transaction": "71eac6d1-483f-11e6-9637-3c15c2c26264"
"operation": "ADD"
"data":
  "requestDataMessage":
    "originRequestDataMessage":
      "present": "false"
  "namespace": "sds"
  "originalRequestDatums":
    "attribute": ":sds.risk/total-premium-amount"
    "attribute": ":sds.agreement/total-premium-amount"
  "supportMessage": "false"
  "originalPayloadDatums":
  "requestSatisfied": "true"
  "remainingRequestDatums":
  "aggregatedDatums":
    "entity": "da2d7fbe-bbff-4fdc-a17b-0d1b31322f63"
    "attribute": ":sds.agreement/total-premium-amount"
    "value": "291.05"
    "transaction": "33"
    "operation": "ADD"
    "entity": "da2d7fbe-bbff-4fdc-a17b-0d1b31322f63"
    "attribute": ":sds.risk/total-premium-amount"
    "value": "291.05"
    "transaction": "33"
    "operation": "ADD"
  "originMessage": "true"
"resolvedData":
    "entity": "da2d7fbe-bbff-4fdc-a17b-0d1b31322f63"
    "attribute": ":sds.agreement/total-premium-amount"
    "value": "291.05"
    "transaction": "33"
    "operation": "ADD"
    "entity": "da2d7fbe-bbff-4fdc-a17b-0d1b31322f63"
    "attribute": ":sds.risk/total-premium-amount"
    "value": "291.05"
    "transaction": "33"
    "operation": "ADD"
```

FIG. 7

| Discovery Resolution Data Message | |
|---|---|
| Field | Description |
| Entity | The unique identifier of the request data message. The identifier correlates to the transaction identifier for the operational facts written for the given event, allowing analysts to correlate operational facts with system events. |
| Attribute | All request data message events will have an attribute specified as "hpm.discovery-resolution/message". |
| Transaction | The unique transaction identifier of this system event. |
| | The value is the actual system event containing the facts of the system necessary to derive business events.<br>requestDataMessage<br>   The source request data message and all its corresponding data points. |
| Data | resolvedData<br>   The subset of aggregated datums matching only those requested as part of the request message originalRequestDatums.<br>timestamp<br>   The exact time this message was created. |

FIG. 8

| Unresolved Data Message | |
|---|---|
| Field | Description |
| Entity | The unique identifier of the request data message. The identifier correlates to the transaction identifier for the operational facts written for the given event, allowing analysts to correlate operational facts with system events. |
| Attribute | All request data message events will have an attribute specified as "hpm.unresolved/message". |
| Transaction | The unique transaction identifier of this system event. |
| | The value is the actual system event containing the facts of the system necessary to derive business events.<br>requestDataMessage<br>    The source request data message and all its corresponding data points. |
| Data | reason<br>    The underlying reason for the unresolved data message.<br>timestamp<br>    The exact time this message was created. |

FIG. 9

| Resource Definition | Resource 1 | Resource 2 | Resource 3 |
|---|---|---|---|
| Input Parameters | "z" | "z" | "z" |
| Output Parameter | "a", "b", "c" | "a", "b" | "c" |
| Cost | $5.00 | $0.05 | $1.00 |
| Priority | 1 | 2 | 2 |

FIG. 11

| Applications | | Processes | Rules | | | Interfaces | | | |
|---|---|---|---|---|---|---|---|---|---|
| Name | Data Possessed | Name | Name | Data Needed | Name | Data Needed | Name | Data Needed | Name |
| Application1 | Data4 | Process1 | Rule1 | Data1 | Interface1 | | | | |
| | Data9 | | | | Interface9 | Data13 | | | |
| | Data3 | | | Data2 | Interface2 | Data10 | Interface11 | | Interface9 |
| | Data5 | | | Data3 | Interface3 | Data4 | | | |
| | Data6 | | | Data4 | Interface4 | Data11 | | | |
| | | | Rule2 | Data5 | Interface5 | | | | |
| | | | | Data2 | Interface2 | Data10 | Interface11 | Data12 | Interface9 |
| | | | | Data6 | Interface6 | Data9 | | | |
| | | | Rule3 | | Interface7 | | | | |
| | | Process2 | | Data2 | Interface2 | Data10 | Interface11 | Data12 | Interface9 |
| | | | | Data6 | Interface6 | Data9 | | | |
| | | | | | Interface8 | | | | |
| | | | Rule4 | Data1 | Interface1 | | | | |
| | | | | Data7 | Interface9 | Data13 | | | |
| | | | | | Interface10 | Data14 | | | |
| | | | Rule5 | Data2 | Interface2 | Data10 | Interface11 | Data12 | Interface9 |
| | | | | Data8 | Interface7 | | | | |

| Applications | | Processes | Rules | | | | Interfaces | | |
|---|---|---|---|---|---|---|---|---|---|
| Name | Data Possessed | Name | Name | Data Needed | Name | Data Needed | Name | Data Needed | Name |
| Application1 | Data4 | Process1 | Rule1 | Data1 | Interface1 | | | | |
| | Data9 | | | | Interface9 | Data13 | Interface6 | Data9 | |
| | Data3 | | | Data2 | Interface2 | Data10 | Interface11 | Data12 | Interface9 |
| | Data5 | | | Data3 | Interface3 | Data4 | | | |
| | Data6 | | | | Interface4 | Data11 | | | |
| | Data1 | | Rule2 | Data4 | Interface5 | | Interface11 | Data12 | Interface9 |
| | Data12 | | | Data5 | Interface2 | Data10 | | | |
| | Data10 | Process2 | | | Interface6 | Data9 | | | |
| | Data2 | | Rule3 | Data2 | Interface7 | | Interface11 | Data12 | Interface9 |
| | Data13 | | | Data6 | Interface2 | Data10 | | | |
| | Data8 | | | | Interface6 | Data9 | | | |
| | | | Rule4 | Data1 | Interface1 | | Interface6 | Data9 | |
| | | | | Data7 | Interface9 | Data13 | Interface5 | Data8 | |
| | | | Rule5 | Data8 | Interface10 | Data14 | Interface11 | Data12 | Interface9 |
| | | | | | Interface2 | Data10 | | | |
| | | | | | Interface7 | | | | |

FIG. 17

| Applications | | Processes | Rules | | | Interfaces | | |
|---|---|---|---|---|---|---|---|---|
| Name | Data Possessed | Name | Name | Data Needed | Name | Data Needed | Name | Data Needed |
| Application1 | Data4 | Process1 | Rule1 | Data1 | Interface1 | | | |
| | Data9 | | | | Interface9 | Data13 | Interface6 | Data9 |
| | Data3 | | | Data2 | Interface2 | Data10 | Interface11 | Data12 |
| | Data5 | | | Data3 | Interface3 | Data4 | | |
| | Data6 | | | Data4 | Interface4 | Data11 | | |
| | Data1 | | Rule2 | | Interface5 | | | |
| | Data12 | | | Data5 | Interface2 | Data10 | Interface11 | Data12 |
| | Data10 | | | | Interface6 | Data9 | | |
| | Data2 | | Rule3 | | Interface7 | | | |
| | Data13 | | | Data2 | Interface2 | Data10 | Interface11 | Data12 |
| | Data8 | | | Data6 | Interface6 | Data9 | | |
| | Data14 | | Rule4 | Data1 | Interface8 | | | |
| | Data7 | Process2 | | | Interface1 | | | |
| | | | | Data7 | Interface9 | Data13 | Interface6 | Data9 |
| | | | Rule5 | | Interface10 | Data14 | Interface5 | Data8 |
| | | | | Data8 | Interface2 | Data10 | Interface11 | Data12 |
| | | | | | Interface7 | | | |

RESOURCE DISCOVERY AGENT COMPUTING DEVICE, SOFTWARE APPLICATION, AND METHOD

RELATED APPLICATIONS

The current application is a continuation of U.S. application Ser. No. 15/808,575, titled "RESOURCE DISCOVERY AGENT COMPUTING DEVICE, SOFTWARE APPLICATION, AND METHOD", filed Nov. 9, 2017, which claims priority benefit, with regarding to all common subject matter, to U.S. Provisional Application Ser. No. 62/422,262, titled "RESOURCE DISCOVERY AGENT COMPUTING DEVICE, SOFTWARE APPLICATION, AND METHOD", filed Nov. 15, 2016; U.S. Provisional Application Ser. No. 62/425,286, titled "RESOURCE DISCOVERY AGENT COMPUTING DEVICE, SOFTWARE APPLICATION, AND METHOD", filed Nov. 22, 2016; and U.S. Provisional Application Ser. No. 62/487,132, titled "RESOURCE DISCOVERY AGENT COMPUTING DEVICE, SOFTWARE APPLICATION, AND METHOD", filed Apr. 19, 2017. The contents of these provisional applications are incorporated by reference, in their entirety and for all purposes, herein.

FIELD OF THE INVENTION

The present disclosure generally relates to computing devices, software applications, and methods that retrieving information from a plurality of information services and providing it to a public application programming interface (API).

BACKGROUND

Software that allows computing systems to communicate with one another, share resources, and retrieve information may require business rules to govern the manner in which the systems interact. This may be a drawback because the business rules are often specific to a particular business unit and limit wider usage of the software.

BRIEF SUMMARY

Embodiments of the present technology relate to computing devices, software applications, computer-implemented methods, and computer-readable media for retrieving information from a plurality of information services and providing it to a public application programming interface (API). The present embodiments overcome the above-discussed problems by avoiding the usage of business rules.

In a first aspect, a computer-implemented method for retrieving information from a plurality of information services and providing it to a public application programming interface (API) may be provided. The method may include, via one or more processors and/or transceivers: (1) receiving a first request data message using a core discovery agent, the request data message including at least one requested datum, for which a value is sought, and at least one known datum, for which a value is known; (2) calling a resource locator to request a location of an information service that provides a value for the requested datum; (3) calling a resource definitions database to find a definition associated with the requested datum; (4) returning the location of the information service and at least one input datum if the resource definitions database includes the definition associated with the requested datum; (5) calling a resource façade to contact the information service if the input datum matches the known datum; (6) transmitting a first information service message including the requested datum and the known datum from the resource façade to the information service; (7) receiving a second information service message from the information service including a value for the requested datum; (8) returning the requested datum and its value from the resource façade to the core discovery agent; and/or (9) transmitting a resolved data message including the requested datum and its value from the core discovery agent to the public API. The method may include additional, fewer, or alternative actions, including those discussed elsewhere herein.

In another aspect, a computing device for retrieving information from a plurality of information services and providing it to a public API may be provided. The computing device may include a communication element, a memory element, and a processing element. The communication element may be configured to provide electronic communication with a communication network. The processing element may be electronically coupled to the memory element. The processing element may be configured to receive a first request data message using a core discovery agent, the request data message including at least one requested datum, for which a value is sought, and at least one known datum, for which a value is known; call a resource locator to request a location of an information service that provides a value for the requested datum; call a resource definitions database to find a definition associated with the requested datum; return the location of the information service and at least one input datum if the resource definitions database includes the definition associated with the requested datum; call a resource façade to contact the information service if the input datum matches the known datum; transmit a first information service message including the requested datum and the known datum from the resource façade to the information service; receive a second information service message from the information service including a value for the requested datum; return the requested datum and its value from the resource façade to the core discovery agent; and/or transmit a resolved data message including the requested datum and its value from the core discovery agent to the public API. The computing device may include additional, fewer, or alternate components and/or functionality, including that discussed elsewhere herein.

In yet another aspect, a software application for retrieving information from a plurality of information services and providing it to a public API may be provided. The software application may comprise a core discovery agent, a resource locator, a resource definitions database, and/or a resource façade. The core discovery agent may be configured to receive messages from the public API or from itself, the messages including at least one requested datum and at least one known datum. The core discovery agent may be further configured to determine whether additional information is needed and, if so, then call another software application component, or send a request data message to itself, and if not, then transmit a resolved data message to the public API. The resource locator may be configured to receive the call from the core discovery agent, to send a query for a definition associated with the requested datum, and to return the definition information to the core discovery agent. The resource definitions database may include a definition for each of a plurality of requested datums and may be configured to receive the query from the resource locator and to provide requested datum information. The resource façade may be configured to send a request for a value for the requested datum to an information service, to receive the requested datum and its value from the information service, and to return the requested datum and its value to the core discovery agent. The software application may include additional, less, or alternate functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of computing devices, software applications, and computer-implemented methods disclosed therein. It should be understood that each Figure depicts an embodiment of a particular aspect of the disclosed computing devices, software applications, and computer-implemented methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 4 is a table illustrating an exemplary format of a request data message;

FIG. 5 illustrates an exemplary request data message;

FIG. 6 is a table illustrating an exemplary format of a resolved data message;

FIG. 7 illustrates an exemplary resolved data message;

FIG. 8 is a table illustrating an exemplary format of a discovery resolution data message;

FIG. 9 is a table illustrating an exemplary format of an unresolved data message;

FIG. 11 is a table illustrating an example of priority of resources;

FIG. 14 is a table illustrating the resource discovery agent of FIG. 13 at a later point in time;

FIG. 16 is a table illustrating the resource discovery agent of FIG. 15 at a later point in time; and FIG. 17 is a table illustrating the resource discovery agent of FIG. 16 at a later point in time.

Figure 1:
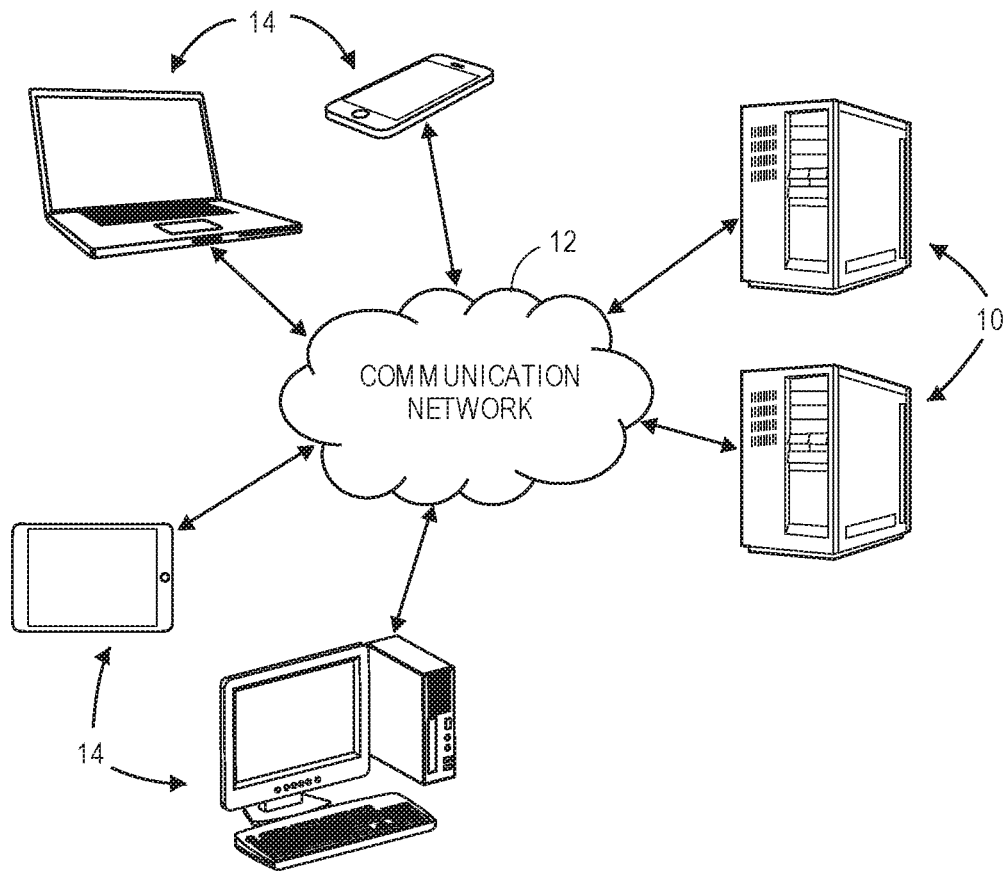
FIG. 1 illustrates an exemplary environment in which various components of a computing device may be utilized, the computing device configured to retrieve information from a plurality of information services and provide it to a public application programming interface (API)

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments may relate to, inter alia, computing devices, software applications, and methods that provide improvements to the manner in which computing devices, specifically, communicate with one another, share resources, and manage data. In particular, the present embodiments provide improvements in retrieving information from a plurality of information services and providing it to a public application programming interface (API). A computing device, through hardware operation, execution of a software application, implementation of a method, or combinations thereof, may be utilized as follows. The computing device may operate in a web or network communication environment in which users, such as customers or potential customers, or employees, such as agents of an insurance provider, are trying to retrieve information, such as rates or premiums for a homeowners, auto, health, or life insurance policy. The computing device, such as a data, file, or web server, may execute a resource discovery agent, which includes the following components: a core discovery agent, a resource locator, a resource definitions database, and a resource façade. In some embodiments, the computing device may also execute the public API, which may be a component of, or in communication with, a web interface on a website which receives requests and/or inputs from the user. The public API may additionally or alternatively be a component of, or in communication with, an interface for data retrieval software utilized within a group, company, or corporation.

During operation, the user (customer, potential customer, insurance agent, etc.) may, through a web browser or other software interface, request information, such as an insurance premium. Typically, the user will also provide some information, such as a name, a house address, a vehicle make and model, or the like. Either directly or indirectly, the public API may receive the request and the input data. The public API may then generate a request data message and send it to the resource discovery agent. The core discovery agent may receive the message and begin a discovery process by analyzing the message. The information that is requested may be considered requested datums, while the information that is provided may be considered known datums. The core discovery agent may call the resource locator to find a location of an information service that will provide values for the requested datums, the resource locator may query the resource definitions database for a definition of the requested datums, wherein the definition includes the location of the information service as well as the information, or input datums, required by the information service in order to provide values for the requested datums. The resource locator may return the definition information to the core discovery agent, which may call the resource façade to contact the information service.

The resource façade may also translate the requested datums and the known datums into a protocol used by the information service before the resource façade sends a message to the information service. The information service may return values for the requested datums to the resource façade, which in turn, translates the requested datums and their values into a protocol used within the resource discovery agent. The core discovery agent may receive the requested datums and their values from the resource façade and may transmit a resolved data message, which includes the requested datums and their values, to the public API.

In some instances, the information service may require input datums that were not provided in the original data request message. In such cases, the core discovery agent may transmit a second data request message to itself which presents the input datums as new requested datums. These new requested datums may also be considered intermediate requested datums. The core discovery agent may then go through the same process as discussed above, wherein it requests the location of the information service which can provide values for the new requested datums. The resource façade may contact the information service and receive the requested values therefrom. After the core discovery agent receives the values for the new requested datums, it may transmit a discovery resolution message to itself to indicate that values for intermediate requested datums have been received, but that values for the original requested datums still have to be discovered. This stage of the process may be repeated multiple times until values for all intermediate datums have been found.

If the resource definitions database does not include a definition for the requested datums, or if the information service cannot be contact or cannot provide the requested information, then the core discovery agent may transmit an unresolved data message to the public API, wherein the message includes a reason for why the requested information cannot be found.

The present embodiments may provide computing devices, software applications, and methods that are scalable and modular. Definitions of requested datums in the resource definitions database may added or deleted. The definitions may also be modified to increase or decrease the scope of each definition. In addition, the resource discovery agent may iterate the discovery process numerous times to find values for intermediate datums which are required in order to discover values for the original requested datums. Furthermore, the resource discovery agent does not need to follow business rules to operate, so it can be utilized in multiple business settings.

Exemplary Computing Device

FIG. 1 depicts an exemplary environment in which embodiments of a computing device 10 may be utilized. The environment may include a communication network 12 and a plurality of electronic devices 14. The computing device 10 may execute a resource discovery agent 16, shown in FIG. 2, which retrieves information from a plurality of information services 18 and provides it to a public application programming interface (API) 20. The resource discovery agent 16 may be utilized in a web environment, wherein one or more users, each using an electronic device 14, are trying to access information from a website through the communication network 12. For example, a user may try to get an estimate for a premium on home insurance or auto insurance from an insurance provider website. As another example, an insurance agent or representative may also try to retrieve a premium estimate for one of his customers.

The communication network 12 generally allows communication between the electronic devices 14 and the computing devices 10. The communication network 12 may include local area networks, metro area networks, wide area networks, cloud networks, the Internet, cellular networks, plain old telephone information service (POTS) networks, and the like, or combinations thereof. The communication network 12 may be wired, wireless, or combinations thereof and may include components such as modems, gateways, switches, routers, hubs, access points, repeaters, towers, and the like. The electronic devices 14 and the computing devices 10 may connect to the communication network 12 either through wires, such as electrical cables or fiber optic cables, or wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth™, or combinations thereof.

Each electronic device 14 may include data processing and storage hardware, a display, data input components such as a keyboard, a mouse, a touchscreen, etc., and communication components that provide wired or wireless communication. Each electronic device 14 may further include software such as a web browser, at the least, which allows the user to access websites. Examples of the electronic devices 14 include desktop computers, laptop computers, palmtop computers, tablet computers, smart phones, wearable electronics, smart watches, wearables, or the like, or combinations thereof.

Figure 2:
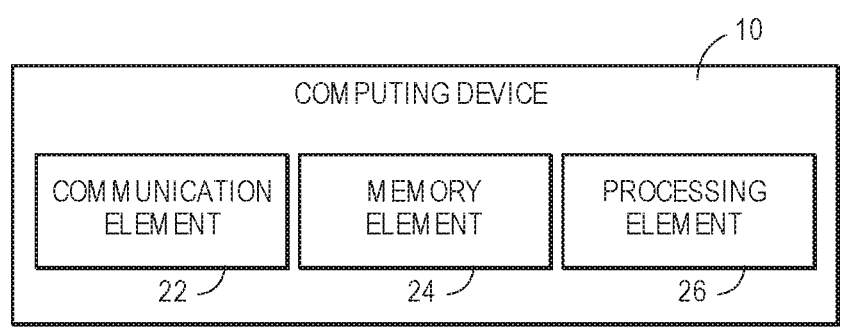
FIG. 2 illustrates various components of an exemplary resource discovery agent shown in block schematic form.
Figure 3:
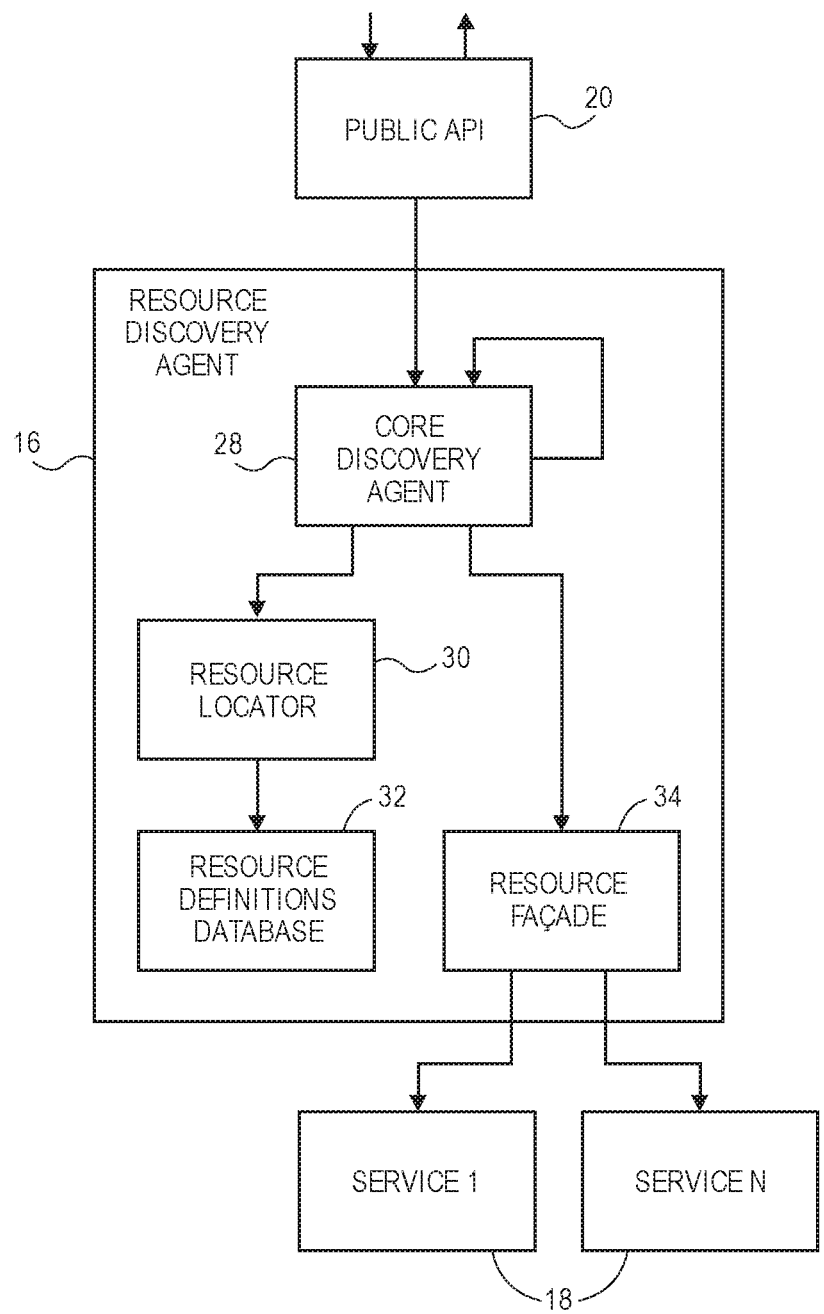
FIG. 3 illustrates various components of the exemplary computing device shown in block schematic form.

The computing device 10, as shown in FIG. 2, may broadly comprise a communication element 22, a memory element 24, and a processing element 26. Examples of the computing device 10 may include one or more computer servers, such as web servers, application servers, database servers, file servers, or the like, or combinations thereof. The computing device 10 may additionally or alternatively include computers such as workstation or desktop computers.

The communication element 22 generally allows the computing device 10 to communicate with the communication network 12 or other computing devices 10. Also, the resource discovery agent's 16 communication with the public API 20 and the information services 18 may occur using the communication element 22. The communication element 22 may include signal and/or data transmitting and receiving circuits, such as antennas, amplifiers, filters, mixers, oscillators, digital signal processors (DSPs), and the like. The communication element 22 may establish communication wirelessly by utilizing RF signals and/or data that comply with communication standards such as cellular 2G, 3G, or 4G, WiFi, WiMAX, Bluetooth™, or combinations thereof. Alternatively, or in addition, the communication element 22 may establish communication through connectors or couplers that receive metal conductor wires or cables which are compatible with networking technologies such as ethernet. In certain embodiments, the communication element 22 may also couple with optical fiber cables. The communication element 22 may be in communication with the memory element 24 and the processing element 26.

The memory element 24 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 24 may be embedded in, or packaged in the same package as, the processing element 26. The memory element 24 may include, or may constitute, a "computer-readable medium." The memory element 24 may store the instructions, code, code segments, software, firmware, programs, applications, apps, information services, daemons, or the like, including the resource discovery agent 16, that are executed by the processing element 26.

The processing element 26 may include processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, software, firmware, programs, applications, apps, processes, information services, daemons, or the like. The processing element 26 may also include hardware components such as finite-state machines, sequential and combinational logic, and other electronic circuits that may perform the functions necessary for the operation of the current invention. The processing element 26 may be in communication with the other electronic components through serial or parallel links that include address buses, data buses, control lines, and the like.

By utilizing hardware, firmware, software, or combinations thereof, the processing element 26 may perform the following tasks. The processing element 26 may execute or run the resource discovery agent 16, which retrieves information from one or more information services 18 and provides it to the public API 20. The information services 18 are sources of information or data and may include databases, data stores, websites, calculation engines, and so forth. The information services 18 may be located anywhere, such as within a company or anywhere in the world that is accessible by the communication network 12. Typically, each information service 18 may receive a query for information and, after searching, sorting, computing, etc., may return the requested information.

In some cases, the information service 18 may require some input data before it can retrieve the information. For example, if the information service 18 is requested to provide an estimated premium or current value of a particular automobile, the information service 18 may need to know data such as a vehicle identification number (VIN), a make, a model, a year, a number of doors, etc., before it can provide the requested information. In addition, the request and the input data may need to be in a certain format or protocol for the information service 18 to accept the request.

The public API 20 is a software program or application that is either a component of, or in communication with, a web interface on a website which receives requests and/or inputs from the user. The public API 20 may also be a component of, or in communication with, an interface for data retrieval software utilized by a group, company, or corporation, such as an insurance provider, wherein an insurance agent or representative is trying to gather information regarding a customer's insurance policies. The public API 20 may be executed on the computing device 10 along with the resource discovery agent 16, or it may be executed on a different computing device.

The resource discovery agent 16 may include a core discovery agent 28, a resource locator 30, a resource definitions database 32, and a resource façade 34. The core discovery agent 28 may receive messages from the public API 20 or itself, determine whether additional information is needed and, if so, call the resource locator 30, call the resource façade 34, or send a message to itself. If not, then the core discovery agent 28 may transmit a resolved message to the public API 20.

The resource locator 30 may serve as an interface to the resource definitions database 32—querying the database 32 for a definition associated with each requested datum and returning the definition information to the core discovery agent 28. The resource definitions database 32 may include a definition for each of a plurality of datums (either requested and/or known). Each definition may include a list of information services 18 which can provide values for the datums, locations of the information services 18, a list of the necessary input data, a format or protocol for the request, the input data, and the information returned, and so forth.

The resource façade 34 generally prepares and sends requests for information to the information services 18. The preparation may include translating, converting, or binding the input data, such as values and identifiers of the values, into the proper protocol or format as required by the information service 18. The resource façade 34 may also receive the information from the information service 18 and translate or convert it into the protocol or format used within the resource discovery agent 16.

While executing or running the resource discovery agent 16, the processing element 26 may receive a first request data message using the core discovery agent 28, wherein the request data message includes at least one requested datum and at least one known datum. The reception of a request data message may be part of a discovery process, which may involve receiving a first request data message from the public API 20 and then receiving a plurality of subsequent request data messages that the core discovery agent 28 sends to itself. The request data message may have a format, as shown in FIG. 4, that includes fields of "entity", "attribute", "transaction", and "data". The "entity", "attribute", and "transaction" fields may be described in FIG. 4. The "data" field may include a plurality of subfields, some of which include requested datums and some of which may include known datums, wherein a datum may be a variable such that the requested datum is a variable for which a value is sought and the known datum is a variable for which a value is known.

Examples of requested datums in the insurance industry may include a premium for a house, a premium for an automobile, a total policy premium, etc. Examples of known datums may include a customer name, a house address, a vehicle make, a vehicle identification number (VIN), etc. The datums listed in the "originalRequestDatums" subfield may be the requested datums for which the public API 20 is seeking values. Any known datums which were passed in with the request from the public API 20 may be listed in the "originalPayloadDatums" subfield. All of the requested datums may be listed in the "remainingRequestDatums" subfield. All of the known datums may be listed in the "aggregatedDatums" subfield.

The other subfields may include "originRequestDataMessage" which may have a "present" attribute that, when it has a value of "true", indicates that the current request data message is not the first, or original, request data message. The "originMessage" subfield may be a Boolean type of variable that, when true, indicates that the current request data message is the first, or original, request data message. The "supportMessage" subfield may be a Boolean type of variable that, when true, indicates that the current request data message is a support, or subsequent, request data message.

In various embodiments, the core discovery agent 28 may create temporary copies of the contents of some of the subfields of the "data" field of the request data message. For example, the core discovery agent 28 may create a "remainingRequestDatums" list which is a copy of the contents of the "remainingRequestDatums" subfield and an "aggregatedDatums" list which is a copy of the "aggregatedDatums" subfield so it can keep a current list of requested datums and known datums.

An example of the request data message from the public API 20 is shown in FIG. 5. The "entity" and "transaction" fields include computer-generated values. The "attribute" field includes the value which identifies a request data message. The "originalRequestDatums" subfield identifies the original requested datums. In this case, values for a risk total premium amount and an agreement total premium amount for a particular customer are being requested. And the "remainingRequestDatums" subfield identifies the remaining requested datums, namely the risk total premium amount and the agreement total premium amount.

The core discovery agent 28 may determine if there are still requested datums by checking the "remainingRequestDatums" list. There should always be remaining requested datums in the original data request message from the public API 20, but there may also be remaining requested datums in subsequent data request messages that the core discovery agent 28 sends to itself. If there are requested datums in the "remainingRequestDatums" list, then the core discovery agent 28 may call the resource locator 30 and request a definition for the requested datums, including a location for one or more information services 18 which can provide values for the requested datums. The call to the resource locator 30 may include at least one requested datum. The resource locator 30 may query the resource definitions database 32 to determine if it includes a definition for the requested datums. If the resource definitions database 32 includes an entry for the requested datums, then the resource locator 30 may return, at least, the location of the information service 18 which can provide values for the requested datums, a list of input datums that are needed by the information service 18 in order to provide the requested datums, and a protocol or format of the input datums and values required by the information service 18. In some situations, the resource definitions database 32 may include a plurality of information services 18 that can provide values for the requested datums. Each definition may also include an expense either charged by the information service 18 or otherwise associated with requesting information from the information service 18. In such situations, the resource locator 30 may also return each information service 18 along with the associated expense.

The core discovery agent 28 may receive the information from the resource locator 30 and may add the input datums to the "remainingRequestDatums" list. The core discovery agent 28 may also compare the input datums with the known datums in the "aggregatedDatums" list. If each of the input datums matches one of the known datums in the "aggregatedDatums" list, then the core discovery agent 28 may call the resource façade 34 to prepare and send a request for information from the information services 18 identified by the resource definitions database 32. The call may include the known datums, and their values, from the "aggregatedDatums" list which matched the input datums required by the information service 18 along with the information service 18 location and the protocol requirements. The resource façade 34 may prepare the request by translating, converting, or binding the requested datums, the known datums, and their values into the proper protocol. The resource façade 34 may then transmit the request to the information service 18.

If there are multiple information services 18 providing the requested datums, then the core discovery agent 28 may select the information service 18 with the lowest expense to receive the request. Alternatively, the core discovery agent 28 may apply certain rules or select the information services 18 that are known to be more reliable.

The information service 18 may receive the request and process it. The information service 18 may perform searching, sorting, computing, etc. in order to acquire the values for the requested datums. The information service 18 may then transmit the requested datums and their values back to the resource façade 34, which may translate or convert the received datums and values into a protocol used within the resource discovery agent 16. The resource façade 34 may return the requested datums and their values to the core discovery agent 28, which may remove those datums from the "remainingRequestDatums" list and add the datums and values to the "aggregatedDatums" list. In some cases, the information service 18 may return more datums and values than were requested. Those additional datums and values are added to the "aggregatedDatums" list. The core discovery agent 28 may recheck the contents of the "remainingRequestDatums" list.

If there are no more requested datums in the "remainingRequestDatums" list, then the core discovery agent 28 may generate a resolved data message. A format for the resolved data message is shown in FIG. 6 and may include the same fields as the request data message with the primary differences being the value of the "attribute" field and the subfields of the "data" field. The "attribute" field may have a value of hpm.resolved/message. The subfields may include a "requestDataMessage" comprising the original request data message and all subsequent data messages related to the original requested datums and a "resolvedData" comprising the originally requested datums and their discovered values, which may be retrieved from the "aggregatedDatums" list. An example of the resolved data message is shown in FIG. 7, wherein values for the originally requested agreement total premium amount and risk total premium amount datums are listed in the "aggregatedDatums" subfield that was part of the original data request message and listed in the "resolvedData" subfield of the current message. Additional information, such as an "entity", a "transaction", and an "operation" are also included for each datum for which a value was found. The resolved data message may be transmitted from the core discovery agent 28 to the public API 20 in order to provide the public API 20 with the information it requested.

If at least some of the input datums, that are received from the resource locator 30 and required by the information service 18 to provide requested datums, are not present in the "aggregatedDatums" list, then this is an indication that intermediate requested datums are needed in order to obtain values for the original requested datums. In this case, the core discovery agent 28 may generate another request data message that includes the contents of the first request data message as well as all of the fields for the request data message as shown in FIG. 4. The core discovery agent 28 may copy the contents of the "remainingRequestDatums" list into the "remainingRequestDatums" subfield and the contents of the "aggregatedDatums" list into the "aggregatedDatums" subfield. For the "originRequestDataMessage" subfield, the core discovery agent 28 may set the value of the "present" attribute to "true". The core discovery agent 28 may also set the value of the "originMessage" subfield to "false" and the value of the "supportMessage" subfield to "true". The core discovery agent 28 may transmit this second request data message to itself. Thus, the core discovery agent 28 may receive the second request data message and may proceed to inspect the message and act according to the contents of the message as discussed above.

Typically, the core discovery agent 28 inspects the "remainingRequestDatums" subfield to determine which requested datums do not have values yet and calls the resource locator 30 to return an information service 18 that can provide the values. Assuming there is an appropriate definition for the requested datums, the core discovery agent 28 may call the resource façade 34 to transmit a third information service message to retrieve values for the intermediate requested datums. The resource façade 34 may receive a fourth information service message from the information service 18 with the values of the intermediate requested datums. Once the intermediate requested datums and their values are returned to the core discovery agent 28, it may generate a discovery resolution data message. A format for the discovery resolution data message is shown in FIG. 8 and may include the same fields as the resolved data message with the primary difference being the value of the "attribute" field. The "attribute" field may have a value of hpm.discovery resolution/message. The "requestDataMessage" subfield may include the previously received request data messages, wherein the most recent request data message may include the contents of the "aggregatedDatums" list and the "remainingRequestDatums" list. The discovery resolution data message signifies that the values for some intermediate datums have been found, but that values for the originally requested datums and possibly other intermediate datums have not been found. The core discovery agent 28 may transmit the discovery resolution data message back to itself. When the core discovery agent 28 receives the discovery resolution data message, it may continue the discovery process as discussed above, wherein the core discovery agent 28 inspects the "remainingRequestDatums" subfield to determine which datums do not have values yet and calls the resource locator 30 to return an information service 18 that can provide the values.

If the resource definitions database 32 does not include a definition for the requested datums, or if the information service 18 does not return the requested values for the datums, or if the information service 18 is unavailable, then either the resource locator 30 or the resource façade 34 may return an error message to the core discovery agent 28. In such a case, the core discovery agent 28 may generate an unresolved data message. A format for the resolved data message is shown in FIG. 9 and may include the same fields as the resolved data message with the primary differences being the value of the "attribute" field and the subfields of the "data" field. The "attribute" field may have a value of hpm.unresolved/message. The subfields may include a "requestDataMessage" comprising the original request data message and all subsequent data messages related to the original requested datums and a "reason" providing a reason for why the requested datums could not be acquired. The reason may include, for example, that the resource discovery agent 16 does not know where to find the requested datums, the information service 18 providing values for the datums was unavailable, etc. The public API 20 may receive the unresolved data message and resubmit the request with different or additional requested datums to be found. Additionally, or alternatively, the public API 20 may submit the unresolved data message to an information technology support team for analysis.

Exemplary Computer-Implemented Method

Figure 10A:
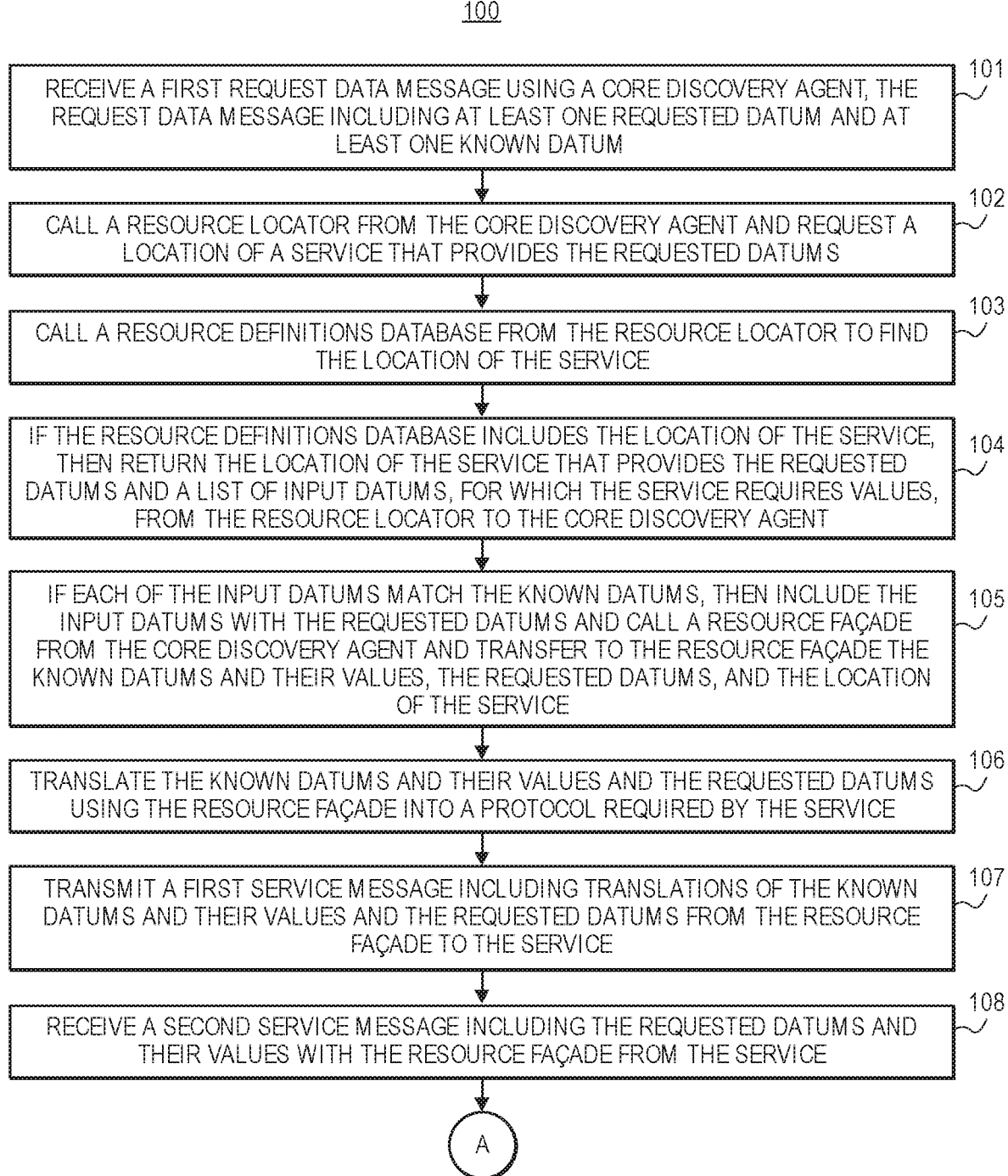
FIGS. 10A and 10B illustrate at least a portion of the steps of an exemplary computer-implemented method for retrieving information from a plurality of information services and providing it to a public API.
Figure 10B:
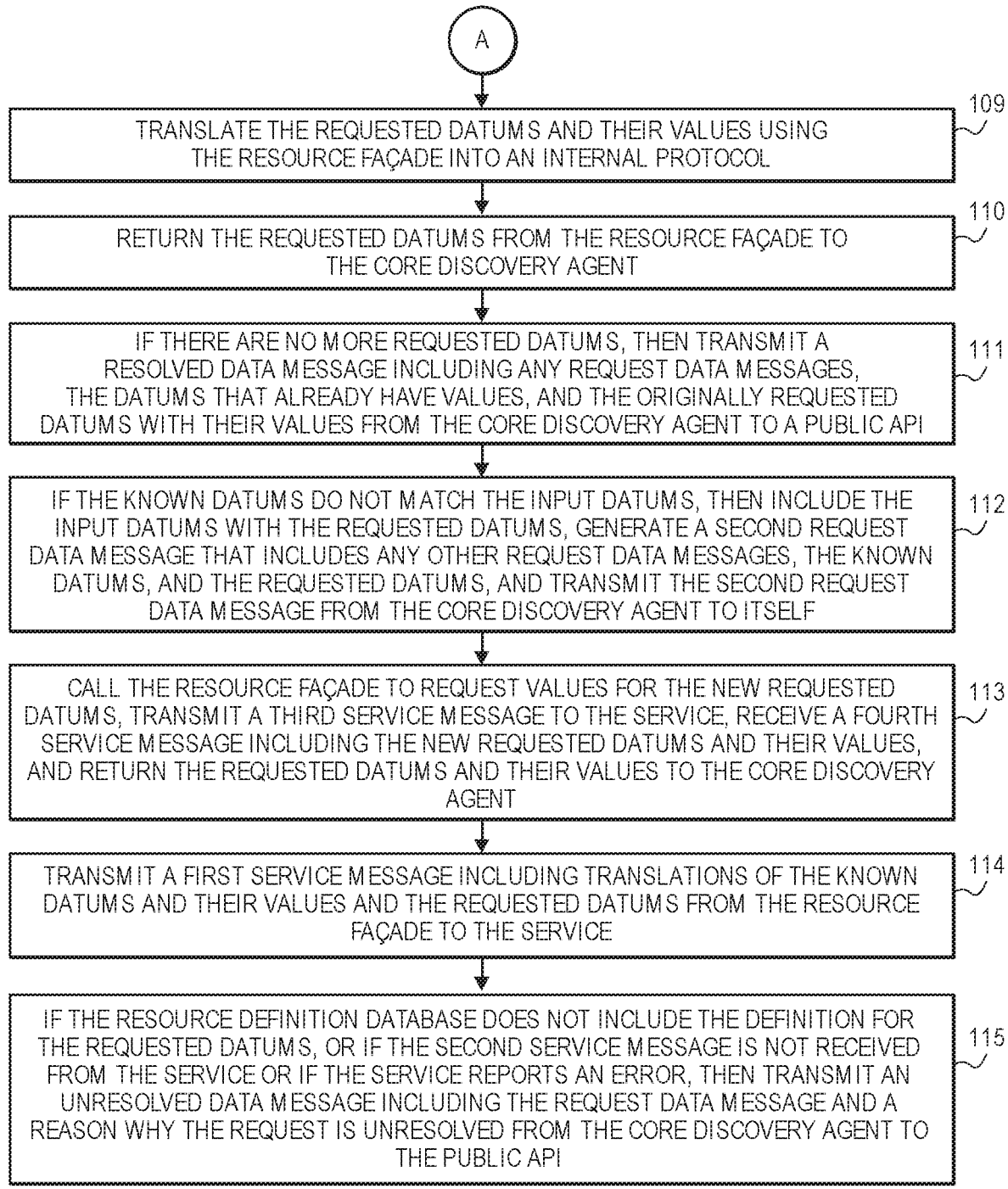

FIGS. 10A and 10B depict a listing of steps of an exemplary computer-implemented method 100 for retrieving information from a plurality of information services 18 and providing it to a public API 20. The steps may be performed in the order shown in FIGS. 10A and 10B, or they may be performed in a different order. Furthermore, some steps may be performed concurrently as opposed to sequentially. In addition, some steps may be optional. The steps of the computer-implemented method 100 may be performed by the computing device 10 through the utilization of processors, transceivers, hardware, software, firmware, or combinations thereof.

Referring to step 101, a first request data message is received using a core discovery agent 28. The request data message may include at least one requested datum and at least one known datum. The reception of a request data message may be part of a discovery process, which may involve receiving a first request data message from the public API 20 and then receiving a plurality of subsequent request data messages that the core discovery agent 28 sends to itself. The request data message may have a format, as shown in FIG. 4, that includes fields of "entity", "attribute", "transaction", and "data". The "entity", "attribute", and "transaction" fields may be described in FIG. 4. The "data" field may include a plurality of subfields, some of which include requested datums and some of which may include known datums, wherein a datum may be a variable such that the requested datum is a variable for which a value is sought and the known datum is a variable for which a value is known.

Examples of requested datums in the insurance industry may include a premium for a house, a premium for an automobile, a total policy premium, etc. Examples of known datums may include a customer name, a house address, a vehicle make, a vehicle identification number (VIN), etc. The datums listed in the "originalRequestDatums" subfield may be the requested datums for which the public API 20 is seeking values. Any known datums which were passed in with the request from the public API 20 may be listed in the "originalPayloadDatums" subfield. All of the requested datums may be listed in the "remainingRequestDatums" subfield. All of the known datums may be listed in the "aggregatedDatums" subfield.

The other subfields may include "originRequestDataMessage" which may have a "present" attribute that, when it has a value of "true", indicates that the current request data message is not the first, or original, request data message. The "originMessage" subfield may be a Boolean type of variable that, when true, indicates that the current request data message is the first, or original, request data message. The "supportMessage" subfield may be a Boolean type of variable that, when true, indicates that the current request data message is a support, or subsequent, request data message.

In various embodiments, the core discovery agent 28 may create temporary copies of the contents of some of the subfields of the "data" field of the request data message. For example, the core discovery agent 28 may create a "remainingRequestDatums" list which is a copy of the contents of the "remainingRequestDatums" subfield and an "aggregatedDatums" list which is a copy of the "aggregatedDatums" subfield so it can keep a current list of those datums for which values still need to be found and those datums for which values have already been found.

Referring to steps 102-104, call a resource locator 30 from the core discovery agent 28 and request a definition for the requested datums, including a location for one or more information services 18 which can provide values for the requested datums. The call to the resource locator 30 may include at least one requested datum. The resource locator 30 may query the resource definitions database 32 to determine if it includes a definition for the requested datums. If the resource definitions database 32 includes an entry for the requested datums, then the resource locator 30 may return, at least, the location of the information service 18 which can provide values for the requested datums, a list of input datums that are needed by the information service 18 in order to provide the requested datums, and a protocol or format of the input datums and values required by the information service 18. In some situations, the resource definitions database 32 may include a plurality of information services 18 that can provide values for the requested datums. Each definition may also include an expense either charged by the information service 18 or otherwise associated with requesting information from the information service 18. In such situations, the resource locator 30 may also return each information service 18 along with the associated expense.

Referring to steps 105-107, if each of the input datums matches one of the known datums in the "aggregatedDatums" list, then call the resource façade 34 with the core discovery agent 28 to prepare and send a request for information from the information services 18 identified by the resource definitions database 32. The call may include the known datums, and their values, from the "aggregatedDatums" list which matched the input datums required by the information service 18 along with the information service 18 location and the protocol requirements. The resource façade 34 may prepare the request by translating, converting, or binding the requested datums, the known datums, and their values into the proper protocol. The resource façade 34 may then transmit the request to the information service 18. The information service 18 may receive the request and process it. The information service 18 may perform searching, sorting, computing, etc. in order to acquire the values for the requested datums. The information service 18 may then transmit the requested datums and their values back to the resource façade 34.

If there are multiple information services 18 providing the requested datums, then the core discovery agent 28 may select the information service 18 with the lowest expense to receive the request. Alternatively, the core discovery agent 28 may apply certain rules or select the information services 18 that are known to be more reliable.

Referring to steps 108-110, a second information service message is received from the information service 18 by the resource façade 34. The message may include the requested datums and their values with the resource façade 34. The resource façade 34 may translate or convert the received datums and values into a protocol used within the resource discovery agent 16. The resource façade 34 may return the requested datums and their values to the core discovery agent 28.

Referring to step 111, if there are no more requested datums, then a resolved data message is transmitted. The resolved data message may include any request data messages, the known datums, and the originally requested datums with their values. The core discovery agent 28 may remove the requested datums received from the resource locator 30 from the "remainingRequestDatums" list and add the datums and values to the "aggregatedDatums" list. In some cases, the information service 18 may return more datums and values than were requested. Those additional datums and values are added to the "aggregatedDatums" list. The core discovery agent 28 may recheck the contents of the "remainingRequestDatums" list. If there are no more datums in the "remainingRequestDatums" list, then the core discovery agent 28 may generate a resolved data message. A format for the resolved data message is shown in FIG. 6 and may include the same fields as the request data message with the primary differences being the value of the "attribute" field and the subfields of the "data" field. The "attribute" field may have a value of hpm.resolved/message. The subfields may include a "requestDataMessage" comprising the original request data message and all subsequent data messages related to the original requested datums and a "resolvedData" comprising the originally requested datums and their discovered values, which may be retrieved from the "aggregatedDatums" list. The resolved data message may be transmitted from the core discovery agent 28 to the public API 20 in order to provide the public API 20 with the information it requested.

Referring to step 112, if the known datums do not match the input datums, then generate a second request data message that includes the contents of the first request data message as well as all of the fields for the request data message as shown in FIG. 4. This situation generally is an indication that intermediate requested datums are needed in order to obtain values for the original requested datums. The core discovery agent 28 may copy the contents of the "remainingRequestDatums" list into the "remainingRequestDatums" subfield and the contents of the "aggregatedDatums" list into the "aggregatedDatums" subfield. For the "originRequestDataMessage" subfield, the core discovery agent 28 may set the value of the "present" attribute to "true". The core discovery agent 28 may also set the value of the "originMessage" subfield to "false" and the value of the "supportMessage" subfield to "true". The core discovery agent 28 may transmit this second request data message to itself. Thus, the core discovery agent 28 may receive the second request data message and may proceed to inspect the message and act according to the contents of the message as discussed above.

Referring to steps 113 and 114, the core discovery agent 28 inspects the "remainingRequestDatums" subfield to determine which requested datums do not have values yet and calls the resource locator 30 to return an information service 18 that can provide the values. Assuming there is an appropriate definition for the requested datums, the core discovery agent 28 may call the resource façade 34 to transmit a third information service message to retrieve values for the intermediate requested datums. The resource façade 34 may receive a fourth information service message from the information service 18 with the values of the intermediate requested datums. Once the intermediate requested datums and their values are returned to the core discovery agent 28, it may generate a discovery resolution data message. A format for the discovery resolution data message is shown in FIG. 8 and may include the same fields as the resolved data message with the primary difference being the value of the "attribute" field. The "attribute" field may have a value of hpm.discovery resolution/message. The "requestDataMessage" subfield may include the previously received request data messages, wherein the most recent request data message may include the contents of the "aggregatedDatums" list and the "remainingRequestDatums" list. The discovery resolution data message signifies that the values for some intermediate datums have been found, but that values for the originally requested datums and possibly other intermediate datums have not been found. The core discovery agent 28 may transmit the discovery resolution data message back to itself. When the core discovery agent 28 receives the discovery resolution data message, it may continue the discovery process as discussed above, wherein the core discovery agent 28 inspects the "remainingRequestDatums" subfield to determine which datums do not have values yet and calls the resource locator 30 to return an information service 18 that can provide the values.

Referring to step 115, if the resource definition database 32 does not include the definition for the requested datums, or if the second information service message is not received from the information service or if the information service reports an error, then transmit an unresolved data message. The resource locator 30 or the resource façade 34 may return an error message to the core discovery agent 28. In such a case, the core discovery agent 28 may generate an unresolved data message. A format for the resolved data message is shown in FIG. 9 and may include the same fields as the resolved data message with the primary differences being the value of the "attribute" field and the subfields of the "data" field. The "attribute" field may have a value of hpm.unresolved/message. The subfields may include a "requestDataMessage" comprising the original request data message and all subsequent data messages related to the original requested datums and a "reason" providing a reason for why the requested datums could not be acquired. The reason may include, for example, that the resource discovery agent 16 does not know where to find the requested datums, the information service 18 providing the datums was unavailable, etc. The public API 20 may receive the unresolved data message and resubmit the request with different or additional datums to be found. Additionally, or alternatively, the public API 20 may submit the unresolved data message to an information technology support team for analysis.

First Exemplary Software Application

FIG. 2 illustrates at least a portion of the components of an exemplary embodiment of the resource discovery agent 16 software application. The resource discovery agent 16 may broadly comprise the core discovery agent 28, the resource locator 30, the resource definitions database 32, and the resource façade 34. The resource discovery agent 16 may be executed on the computing device 10 and may retrieve information from the information services 18 and provide it to the public API 20. The resource discovery agent 16 may be utilized in a web environment, as seen in FIG. 1 wherein one or more users, each using an electronic device 14, are trying to access information from a website through the communication network 12. For example, a user may try to get an estimate for a premium on home insurance or auto insurance from an insurance provider website. As another example, an insurance agent or representative may also try to retrieve a premium estimate for one of his customers.

The core discovery agent 28 may receive messages from the public API 20 or itself, determine whether additional information is needed and, if so, call the resource locator 30, call the resource façade 34, or send a message to itself. If not, then the core discovery agent 28 may transmit a resolved message to the public API 20.

The resource locator 30 may serve as an interface to the resource definitions database 32—querying the database 32 for a definition associated with each requested datum and returning the definition information to the core discovery agent 28. The resource definitions database 32 may include a definition for each of a plurality of datums (either requested and/or known). Each definition may include a list of information services 18 which can provide values for the datums, locations of the information services 18, a list of the necessary input data, a format or protocol for the request, the input data, and the information returned, and so forth.

The resource façade 34 generally prepares and sends requests for information, or values for requested datums, to the information services 18. The preparation may include translating, converting, or binding the input data, such as values and identifiers of the values, into the proper protocol or format as required by the information service 18. The resource façade 34 may also receive the information from the information service 18 and translate or convert it into the protocol or format used within the resource discovery agent 16.

In more detail, the core discovery agent 28 may receive a first request data message, wherein the request data message includes at least one requested datum and at least one known datum. The reception of a request data message may be part of a discovery process, which may involve receiving a first request data message from the public API 20 and then receiving a plurality of subsequent request data messages that the core discovery agent 28 sends to itself. The request data message may have a format, as shown in FIG. 4, that includes fields of "entity", "attribute", "transaction", and "data". The "entity", "attribute", and "transaction" fields may be described in FIG. 4. The "data" field may include a plurality of subfields, some of which include requested datums and some of which may include known datums, wherein a datum may be a variable such that the requested datum is a variable for which a value is sought and the known datum is a variable for which a value is known.

Examples of requested datums in the insurance industry may include a premium for a house, a premium for an automobile, a total policy premium, etc. Examples of known datums may include a customer name, a house address, a vehicle make, a vehicle identification number (VIN), etc. The datums listed in the "originalRequestDatums" subfield may be the requested datums for which the public API 20 is seeking values. Any known datums which were passed in with the request from the public API 20 may be listed in the "originalPayloadDatums" subfield. All of the requested datums may be listed in the "remainingRequestDatums" subfield. All of the known datums may be listed in the "aggregatedDatums" subfield.

The other subfields may include "originRequestDataMessage" which may have a "present" attribute that, when it has a value of "true", indicates that the current request data message is not the first, or original, request data message. The "originMessage" subfield may be a Boolean type of variable that, when true, indicates that the current request data message is the first, or original, request data message. The "supportMessage" subfield may be a Boolean type of variable that, when true, indicates that the current request data message is a support, or subsequent, request data message.

In various embodiments, the core discovery agent 28 may create temporary copies of the contents of some of the subfields of the "data" field of the request data message. For example, the core discovery agent 28 may create a "remainingRequestDatums" list which is a copy of the contents of the "remainingRequestDatums" subfield and an "aggregatedDatums" list which is a copy of the "aggregatedDatums" subfield so it can keep a current list of requested datums and known datums.

An example of the request data message from the public API 20 is shown in FIG. 5. The "entity" and "transaction" fields include computer-generated values. The "attribute" field includes the value which identifies a request data message. The "originalRequestDatums" subfield identifies the original requested datums. In this case, values for a risk total premium amount and an agreement total premium amount for a particular customer are being requested. And the "remainingRequestDatums" subfield identifies the remaining requested datums, namely the risk total premium amount and the agreement total premium amount.

The core discovery agent 28 may determine if there are still requested datums by checking the "remainingRequestDatums" list. There should always be remaining requested datums in the original data request message from the public API 20, but there may also be remaining requested datums in subsequent data request messages that the core discovery agent 28 sends to itself. If there are requested datums in the "remainingRequestDatums" list, then the core discovery agent 28 may call the resource locator 30 and request a definition for the requested datums, including a location for one or more information services 18 which can provide values for the requested datums. The call to the resource locator 30 may include at least one requested datum. The resource locator 30 may query the resource definitions database 32 to determine if it includes a definition for the requested datums. If the resource definitions database 32 includes an entry for the requested datums, then the resource locator 30 may return, at least, the location of the information service 18 which can provide values for the requested datums, a list of input datums that are needed by the information service 18 in order to provide the requested datums, and a protocol or format of the input datums and values required by the information service 18. In some situations, the resource definitions database 32 may include a plurality of information services 18 that can provide values for the requested datums. Each definition may also include an expense either charged by the information service 18 or otherwise associated with requesting information from the information service 18. In such situations, the resource locator 30 may also return each information service 18 along with the associated expense.

The core discovery agent 28 may receive the information from the resource locator 30 and may add the input datums to the "remainingRequestDatums" list. The core discovery agent 28 may also compare the input datums with the known datums in the "aggregatedDatums" list. If each of the input datums matches one of the known datums in the "aggregatedDatums" list, then the core discovery agent 28 may call the resource façade 34 to prepare and send a request for information from the information services 18 identified by the resource definitions database 32. The call may include the known datums, and their values, from the "aggregatedDatums" list which matched the input datums required by the information service 18 along with the information service 18 location and the protocol requirements. The resource façade 34 may prepare the request by translating, converting, or binding the requested datums, the known datums, and their values into the proper protocol. The resource façade 34 may then transmit the request to the information service 18.

If there are multiple information services 18 providing the requested datums, then the core discovery agent 28 may select the information service 18 with the lowest expense to receive the request. Alternatively, the core discovery agent 28 may apply certain rules or select the information services 18 that are known to be more reliable.

The information service 18 may receive the request and process it. The information service 18 may perform searching, sorting, computing, etc. in order to acquire the values for the requested datums. The information service 18 may then transmit the requested datums and their values back to the resource façade 34, which may translate or convert the received datums and values into a protocol used within the resource discovery agent 16. The resource façade 34 may return the requested datums and their values to the core discovery agent 28, which may remove those datums from the "remainingRequestDatums" list and add the datums and values to the "aggregatedDatums" list. In some cases, the information service 18 may return more datums and values than were requested. Those additional datums and values are added to the "aggregatedDatums" list. The core discovery agent 28 may recheck the contents of the "remainingRequestDatums" list.

If there are no more requested datums in the "remainingRequestDatums" list, then the core discovery agent 28 may generate a resolved data message. A format for the resolved data message is shown in FIG. 6 and may include the same fields as the request data message with the primary differences being the value of the "attribute" field and the subfields of the "data" field. The "attribute" field may have a value of hpm.resolved/message. The subfields may include a "requestDataMessage" comprising the original request data message and all subsequent data messages related to the original requested datums and a "resolvedData" comprising the originally requested datums and their discovered values, which may be retrieved from the "aggregatedDatums" list. An example of the resolved data message is shown in FIG. 7, wherein values for the originally requested agreement total premium amount and risk total premium amount datums are listed in the "aggregatedDatums" subfield that was part of the original data request message and listed in the "resolvedData" subfield of the current message. Additional information, such as an "entity", a "transaction", and an "operation" are also included for each datum for which a value was found. The resolved data message may be transmitted from the core discovery agent 28 to the public API 20 in order to provide the public API 20 with the information it requested.

If at least some of the input datums, that are received from the resource locator 30 and required by the information service 18 to provide requested datums, are not present in the "aggregatedDatums" list, then this is an indication that intermediate requested datums are needed in order to obtain values for the original requested datums. In this case, the core discovery agent 28 may generate another request data message that includes the contents of the first request data message as well as all of the fields for the request data message as shown in FIG. 4. The core discovery agent 28 may copy the contents of the "remainingRequestDatums" list into the "remainingRequestDatums" subfield and the contents of the "aggregatedDatums" list into the "aggregatedDatums" subfield. For the "originRequestDataMessage" subfield, the core discovery agent 28 may set the value of the "present" attribute to "true". The core discovery agent 28 may also set the value of the "originMessage" subfield to "false" and the value of the "supportMessage" subfield to "true". The core discovery agent 28 may transmit this second request data message to itself. Thus, the core discovery agent 28 may receive the second request data message and may proceed to inspect the message and act according to the contents of the message as discussed above.

Typically, the core discovery agent 28 inspects the "remainingRequestDatums" subfield to determine which requested datums do not have values yet and calls the resource locator 30 to return an information service 18 that can provide the values. Assuming there is an appropriate definition for the requested datums, the core discovery agent 28 may call the resource façade 34 to transmit a third information service message to retrieve values for the intermediate requested datums. The resource façade 34 may receive a fourth information service message from the information service 18 with the values of the intermediate requested datums. Once the intermediate requested datums and their values are returned to the core discovery agent 28, it may generate a discovery resolution data message. A format for the discovery resolution data message is shown in FIG. 8 and may include the same fields as the resolved data message with the primary difference being the value of the "attribute" field. The "attribute" field may have a value of hpm.discovery resolution/message. The "requestDataMessage" subfield may include the previously received request data messages, wherein the most recent request data message may include the contents of the "aggregatedDatums" list and the "remainingRequestDatums" list. The discovery resolution data message signifies that the values for some intermediate datums have been found, but that values for the originally requested datums and possibly other intermediate datums have not been found. The core discovery agent 28 may transmit the discovery resolution data message back to itself. When the core discovery agent 28 receives the discovery resolution data message, it may continue the discovery process as discussed above, wherein the core discovery agent 28 inspects the "remainingRequestDatums" subfield to determine which datums do not have values yet and calls the resource locator 30 to return an information service 18 that can provide the values.

If the resource definitions database 32 does not include a definition for the requested datums, or if the information service 18 does not return the requested values for the datums, or if the information service 18 is unavailable, then either the resource locator 30 or the resource façade 34 may return an error message to the core discovery agent 28. In such a case, the core discovery agent 28 may generate an unresolved data message. A format for the resolved data message is shown in FIG. 9 and may include the same fields as the resolved data message with the primary differences being the value of the "attribute" field and the subfields of the "data" field. The "attribute" field may have a value of hpm.unresolved/message. The subfields may include a "requestDataMessage" comprising the original request data message and all subsequent data messages related to the original requested datums and a "reason" providing a reason for why the requested datums could not be acquired. The reason may include, for example, that the resource discovery agent 16 does not know where to find the requested datums, the information service 18 providing values for the datums was unavailable, etc. The public API 20 may receive the unresolved data message and resubmit the request with different or additional requested datums to be found. Additionally, or alternatively, the public API 20 may submit the unresolved data message to an information technology support team for analysis.

Second Exemplary Software Application

FIGS. 12-17 illustrate at least a portion of the components of another exemplary embodiment of the resource discovery agent 200, which may also be executed by the processing element 26 of the computing device 10. The resource discovery agent 200 may allow for information needed by an application 202 to be discovered dynamically at run time of the application 202. The information may take the form of a plurality of datums, for which values are sought. The application 202 may be similar to the public API 20 discussed above. The resource discovery agent 200 may utilize a plurality of processes 204, a plurality of rules 206, and a plurality of interfaces 208 in order to provide requested information to the application 202.

The application 202 may implement a procedure, such as a business flow, which seeks to provide information to a user, who is a customer/client or a potential customer/client, regarding services from a financial and/or insurance provider, among others. For instance, the user may try to get an estimate for a premium on home insurance or auto insurance for a new or existing policy from an insurance provider website. In another instance, the user may be trying to apply for a credit card or a loan from a financial institution.

Each process 204 may perform a particular function as part of the procedure implemented by the application 202. Thus, one application 202 may call on, or depend upon, one or more processes 204. In addition, one process 204 may be called upon by one or more applications 202. Each process 204 may acquire or retrieve at least a portion of values of datums required by the application 202. In addition, or instead, each process 204 may acquire values of intermediate datums that are required to retrieve the values of datums provided to the application 202. Values of intermediate datums may also be provided by the user. In continuing one of the examples above, if the user is trying get an estimate for a premium on home insurance, then he may provide his name and address. An exemplary process may determine whether the user is an existing customer or a potential new customer. In this case, the user provided the values of some intermediate datums (user name and address) while the process 204 acquired the values of other intermediate datums (existing customer or potential new customer). One or more other processes 204 may perform the other functions necessary to implement the procedure of the application 202. Thus, other processes 204 may retrieve information about the house to be insured, such as square footage, number of stories, number of bedrooms and bathrooms, and the like, which may be utilized to determine or calculate the home insurance premium.

Each process 204 may apply one or more rules 206, such as business rules, that require at least one condition to be met. As an example, one rule 206 may verify that the user is at least a certain age to apply for a credit card. Another rule may verify that an address provided by the user for a homeowner's policy is valid. Each rule 206 may require values for one or more datums. Examples of datums may include the user's name, the user's date of birth, the user's address, etc., wherein the datum may have an alphanumeric value. The datums may also include an insurance premium, amounts of coverage for various policies, a credit limit, a loan amount, and the like. The datums may also have a Boolean or binary value, such as whether the user's address is valid or invalid.

The value for each datum may be provided by one or more interfaces 208, which contact various services that supply values for requested datums, request the datum values, and receive the datum values. In some cases, the values for datums may be stored in one or more databases in the possession of the insurance provider or financial institution. Thus, the interface 208 may access the database, request and then receive values for the datums. Or, the values for datums may be stored or retained in sources outside the provider or institution that are available through the Internet. In this instance, the interface 208 may send a request through the Internet to a web site to retrieve values for the datums. Each interface 208 may be configured to retrieve the values for one or more datums. Typically, the interface 208 needs the value of one or more datums as inputs in order to retrieve requested values. For example, the user's address may be needed to retrieve numerous pieces of information, or datum values, pertaining a house and property at the address such as an age of the house, a square footage of the house, a square footage or acreage of the property, etc. In some cases, the values of intermediate datums needed as inputs for interfaces 208 to retrieve values of other datums may be provided by the user. In other cases, the values of intermediate datums needed as inputs for interfaces 208 to retrieve values of other datums may be retrieved using other interfaces 208.

The interfaces 208 are typically utilized dynamically since it may not be known which datums have values when the application 202 is initially executed. Thus, when a first interface 208 is to be utilized to retrieve a value for a first datum using a value for a second datum as an input and the value of the second datum is not known, then a second interface 208 may be utilized to retrieve the value of the second datum using a value of a third datum as input. If the value of the third datum is not known, then a third interface 208 may be utilized to retrieve that value. The second and third datums may be considered intermediate datums. Additional interfaces 208 may be utilized dynamically as required until a value of a datum needed as input for a subsequently utilized interface 208 is known.

The resource discovery agent 200 may comprise a database or definitions repository that includes parameters associated with each application 202, such as a list of processes 204 called by the application 202, a list of rules 206 applied by each process 204, and a list of which interfaces 208 providing values for datums and those datums whose values are needed as inputs for the interfaces 208.

Figure 12:
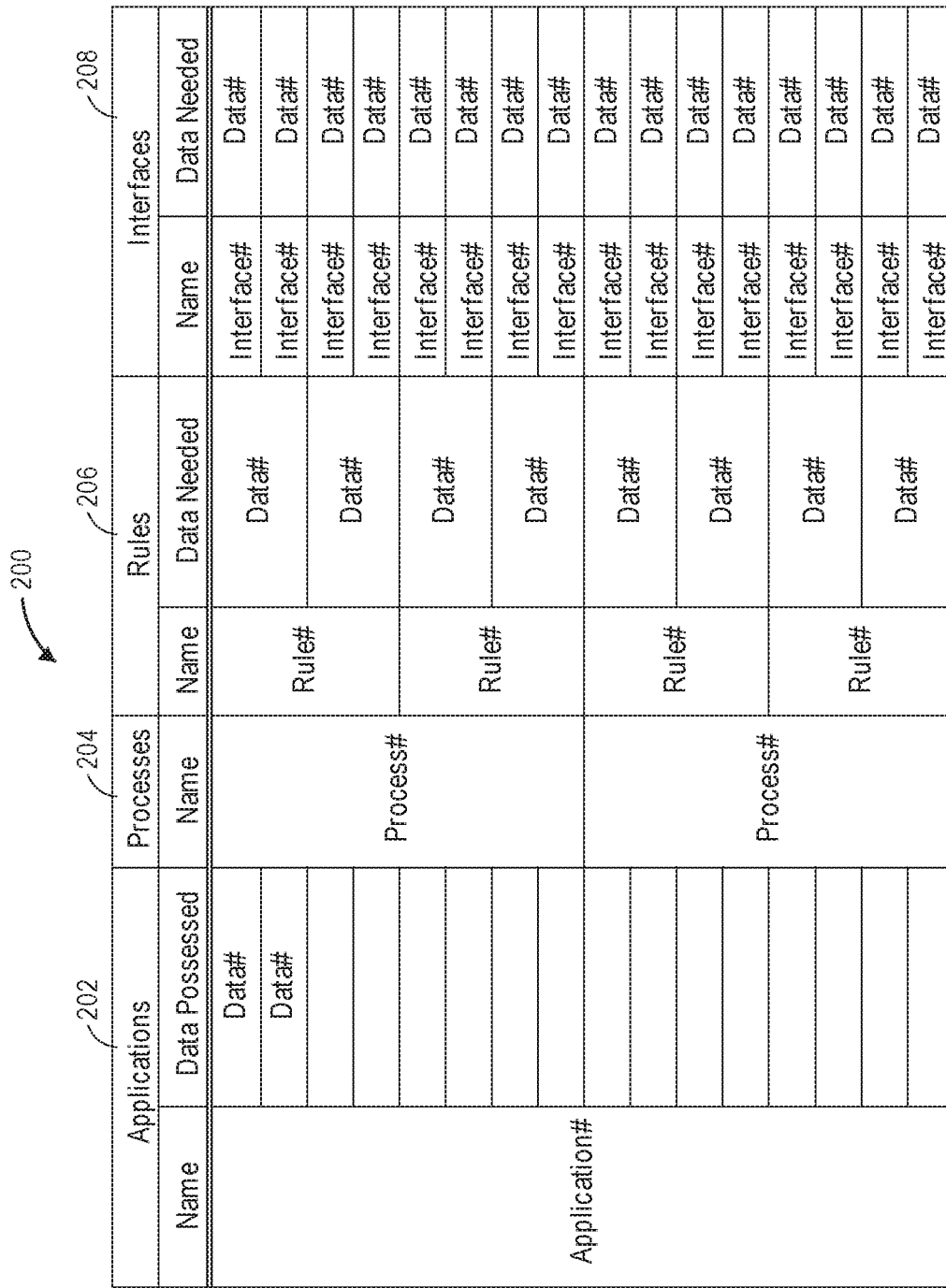
FIG. 12 is a table illustrating various components of another embodiment of a resource discovery agent in general form.

FIG. 12 shows the components of the resource discovery agent 200 in tabular or spreadsheet form. The table comprises a plurality of columns and a plurality of rows— including two header rows which identify applications 202, processes 204, rules 206, and interfaces 208. The table illustrates the process of the acquisition of data required for a particular application 202. The table may include a first column to display the name (Application #) of the current application 202. In a second column, the datums (Data #) in possession, or for which values have been received or retrieved, may be listed. Typically, the application 202 may have already received at least one datum value from the user, such as a name, date of birth, etc., when the application 202 utilizes the resource discovery agent 200 to acquire the rest of the information needed. The table may include a third column to display the name (Process #) of the processes 204 that are executed for the application 202. The table may include a fourth column to display the name (Rule #) of the rules 206 that are applied for each process 204. The table may include a fifth column to display the datums whose values are needed for each rule 206. The table may include a sixth column to display the name (Interface #) of the interfaces 208 that provide datum values for each rule 206. The table may include a seventh column to display the datums whose values are needed as inputs for the interface 208 to retrieve the value of the requested datum. When the value of the datum needed as input to the first interface 208 (in column 6) is not known, there may be additional columns in the table that list additional interfaces 208 which will dynamically provide the values of unknown datums.

Figure 13:
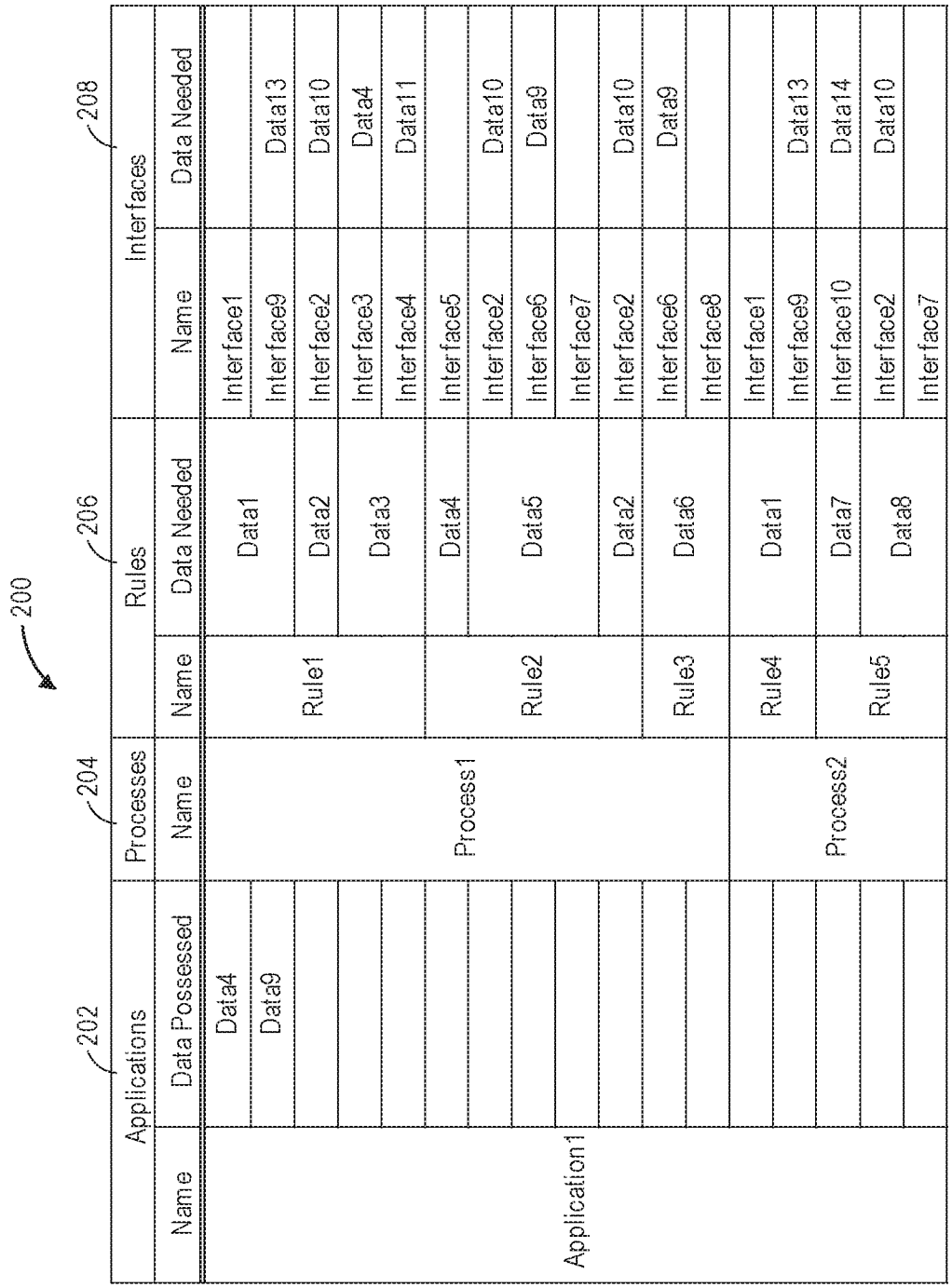
FIG. 13 is a table illustrating an example of the resource discovery agent of FIG. 12.

FIGS. 13-17 illustrate an example of the resource discovery agent 200 being used to retrieve information for Application1. FIG. 13 includes a table that illustrates the beginning of the process, wherein the user has accessed a website from an insurance provider and/or financial institution to get a premium quote, apply for a credit card or loan, etc. The user may be required to supply some information to start the procedure. In this example, the user has provided Data4 and Data9 (listed in the "Data Possessed" column), which may represent the user's name and address, the user's name and date of birth, or the like. The table of FIG. 13 further lists the following processes 204, rules 206, and interfaces 208 that are utilized in this example of the resource discovery agent 200. Application1 calls on Process1 and Process2. Process1 includes Rule1, Rule2, and Rule3. Rule1 requires Data1, Data2, and Data3. Data1 may be provided by Interface1 or Interface9. Interface9 requires Data13 as input. Data2 may be provided by Interface2, which requires Data10 as input. Data3 may be provided by Interface3 or Interface4. Interface3 requires Data4 as input, while Interface4 requires Data11 as input. Rule2 requires Data4, Data5, and Data2. Data4 may be provided by Interface5. Data5 may be provided by Interface2, Interface6, or Interface7. Interface2 requires Data10 as input, while Interface6 requires Data9 as input. Data2 may be provided by Interface2, which requires Data10 as input. Rule3 requires Data6, which may be provided by Interface6 or Interface8. Interface6 requires Data9 as input. Process2 includes Rule4 and Rule5. Rule4 requires Data1 which may be provided by Interface1 or Interface9. Interface9 requires Data13 as input. Rule5 requires Data7 and Data8. Data7 may be provided by Interface10, which requires Data14 as input. Data8 may be provided by Interface2 or Interface7. Interface2 requires Data10 as input. The datums needed as inputs for Interfaces 1, 5, 7, and 8 may be unknown or may be filled in at a later time. The table of FIG. 13 indicates that, through the processes 204 called and the rules 206 that are applied, datums Data1 through Data8 are needed for Application1 to be complete.

The table of FIG. 14 illustrates the status of the retrieval of information for Application1 at a point in time after the table of FIG. 13. As a result of Data4 and Data9 being provided, Data3 was retrieved by Interface3 using Data4 as input. Data5 was retrieved by Interface6 using Data9 as input. And, Data6 was retrieved by Interface6 using Data9 as input. Thus, Data3, Data5, and Data6 are listed in the "Data Possessed" column. The table of FIG. 14 also includes additional columns of interfaces 208 that may be dynamically utilized if the value of the datum needed as input for the first interface 208 is not known. The table of FIG. 14 also illustrates at least portion of a data chain for those interfaces 208 for which the value of the datum needed as input is not known. The data chain may include a plurality of datums whose values must be retrieved, and the interfaces 208 that provide them, in sequence before the value for a given datum is retrieved, as part of the dynamic utilization of the interfaces 208. For example, Data2 may be retrieved through Interface2 using Data10 as input. But, if Data10 is not known, then its value may be retrieved through Interface11 using Data12 as input. And, Data12 may be retrieved through Interface9. The table of FIG. 14 also shows the data chain for providing a value of Data8.

Figure 15:
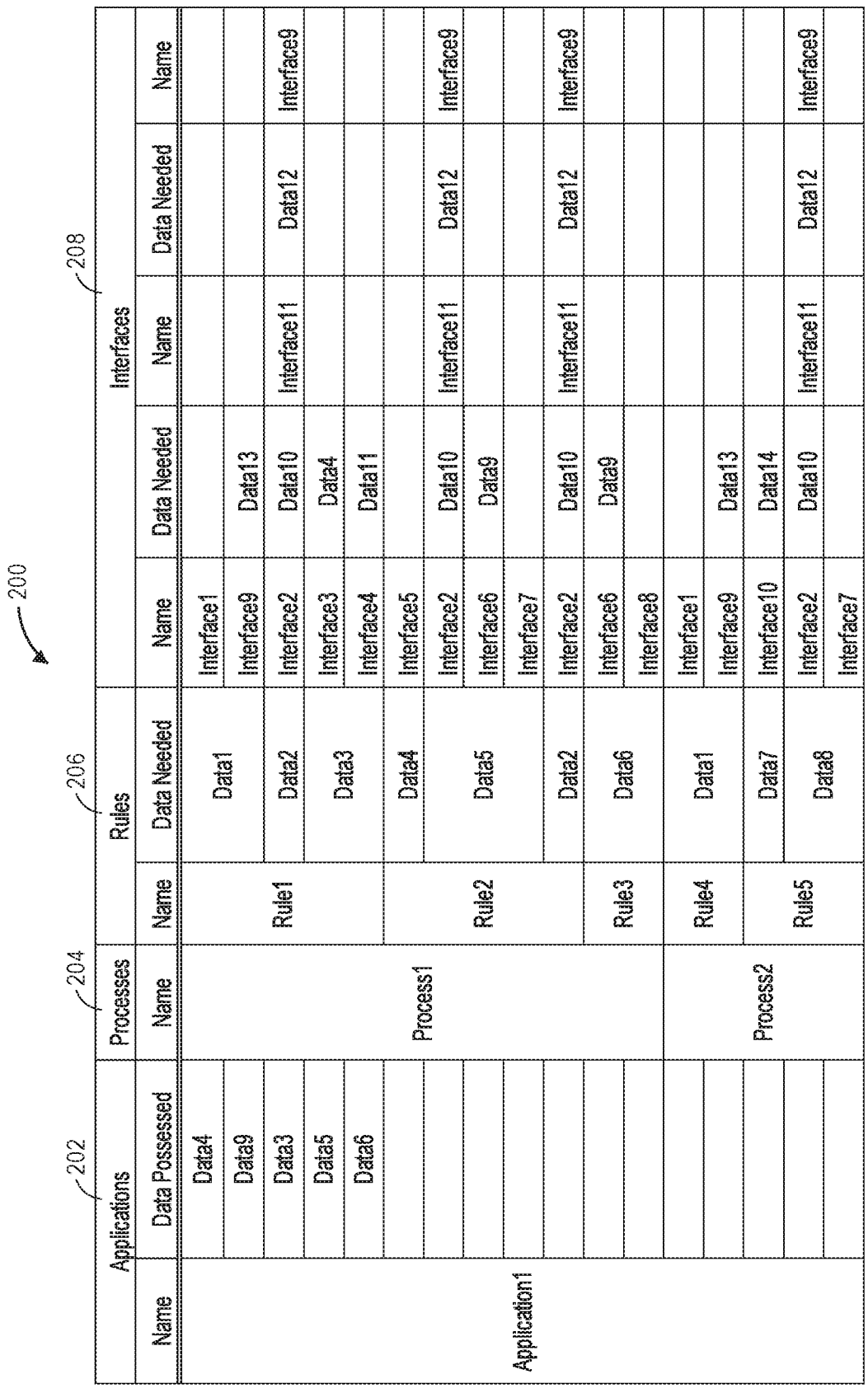
FIG. 15 is a table illustrating the resource discovery agent of FIG. 14 at a later point in time.

The table of FIG. 15 illustrates the status of the retrieval of information for Application 1 at a point in time after the table of FIG. 14 and shows that some of the datum values needed as inputs to the interfaces 208 to provide values of the datums needed for each rule 206 were not initially available. Thus, at least the second level of datums in the data chain have to be retrieved to obtain the values of the datums needed for some rules 206. For example, a value for Data13 may be needed by Interface9 to retrieve a value for Data1. Since Data13 is not initially available, its value may be retrieved through Interface6 using the value of Data9 as an input. The value of Data9 was initially provided, so the value of Data1 may be obtained after the value of Data13 is obtained. Also, the value of Data12 may have been retrieved, thus providing the values of Data10, Data5, and Data8.

The table of FIG. 16 illustrates the status of the retrieval of information for Application1 at a point in time after the table of FIG. 15 and shows that in the second column, the resource discovery agent 200 is now in possession of Data1, Data12, Data10, Data2, Data13, and Data8. Thus, all of the datums, Data1 through Data6 and Data8, required by Application1, with the exception of Data7, have been retrieved. The table of FIG. 16 indicates that Data7 may be provided by Interface10 with a value of Data14 as an input. But, Data14 was not provided initially, so the table further indicates that Data14 may be provided by Interface5 with the value of Data8 as an input. Since Data8 is known at this point, Data14 and, in turn, Data7 may be retrieved.

The table of FIG. 17 illustrates the status of the retrieval of information for Application1 at a point in time after the table of FIG. 16 and shows that in the second column, the resource discovery agent 200 is now in possession of all of the data required by Application1.

Exemplary Computer-Implemented Method for Retrieving Information from a Plurality of Information Services and Providing it to a Public Application Programming Interface (API)

In a first aspect, a computer-implemented method for retrieving information from a plurality of information services and providing it to a public application programming interface (API) may be provided. The method may include, via one or more processors and/or transceivers: (1) receiving a first request data message using a core discovery agent, the request data message including at least one requested datum, for which a value is sought, and at least one known datum, for which a value is known; (2) calling a resource locator to request a location of an information service that provides a value for the requested datum; (3) calling a resource definitions database to find a definition associated with the requested datum; (4) returning the location of the information service and at least one input datum if the resource definitions database includes the definition associated with the requested datum; (5) calling a resource façade to contact the information service if the input datum matches the known datum; (6) transmitting a first information service message including the requested datum and the known datum from the resource façade to the information service; (7) receiving a second information service message from the information service including a value for the requested datum; (8) returning the requested datum and its value from the resource façade to the core discovery agent; and/or (9) transmitting a resolved data message including the requested datum and its value from the core discovery agent to the public API. The method may include additional, fewer, or alternative actions, including those discussed elsewhere herein.

For instance, the method may include, via one or more processors: transmitting an unresolved data message from the core discovery agent to the public API if the resource definitions database does not include a definition for the requested datum, wherein the unresolved data message includes a reason why a value could not be found for the requested datum; and transmitting an unresolved data message from the core discovery agent to the public API if the resource façade cannot contact the information service or if the information service does not return a value for the requested datum, wherein the unresolved data message includes a reason why a value could not be found for the requested datum; transmitting a second request data message from the core discovery agent to itself if the input datum does not match the known datum, the second request data message including the original requested datum, the known datum, and the input datum as a new requested datum. In addition the method may include receiving the second request data message; calling the resource locator to request the location of the information service that provides a value for the new requested datum; calling the resource definitions database to find a definition associated with the new requested datum; returning the location of the information service; calling a resource façade to contact the information service; transmitting a third information service message including the new requested datum from the resource façade to the information service; receiving a fourth information service message from the information service including a value for the new requested datum; returning the new requested datum and its value from the resource façade to the core discovery agent; and/or transmitting a discovery resolution data message including the new requested datum and its value from the core discovery agent to itself. Furthermore, the method may include translating the requested datum and the known datum into a protocol used by the information service before transmitting the first information service message from the resource façade and translating the requested datum and its value from the second information service message into a protocol used by the core discovery agent before returning the requested datum and its value to the core discovery agent.

Exemplary Computing Device for Retrieving Information from a Plurality of Information Services and Providing it to a Public Application Programming Interface (API)

In another aspect, a computing device for retrieving information from a plurality of information services and providing it to a public application programming interface (API) may be provided. The computing device may include a communication element, a memory element, and a processing element. The communication element may be configured to provide electronic communication with a communication network. The processing element may be electronically coupled to the memory element. The processing element may be configured to receive a first request data message using a core discovery agent, the request data message including at least one requested datum, for which a value is sought, and at least one known datum, for which a value is known; call a resource locator to request a location of an information service that provides a value for the requested datum; call a resource definitions database to find a definition associated with the requested datum; return the location of the information service and at least one input datum if the resource definitions database includes the definition associated with the requested datum; call a resource façade to contact the information service if the input datum matches the known datum; transmit a first information service message including the requested datum and the known datum from the resource façade to the information service; receive a second information service message from the information service including a value for the requested datum; return the requested datum and its value from the resource façade to the core discovery agent; and/or transmit a resolved data message including the requested datum and its value from the core discovery agent to the public API. The computing device may include additional, fewer, or alternate components and/or functionality, including that discussed elsewhere herein.

For instance, the processing element may be further configured to: transmit an unresolved data message from the core discovery agent to the public API if the resource definitions database does not include a definition for the requested datum, wherein the unresolved data message includes a reason why a value could not be found for the requested datum; transmit an unresolved data message from the core discovery agent to the public API if the resource façade cannot contact the information service or if the information service does not return a value for the requested datum, wherein the unresolved data message includes a reason why a value could not be found for the requested datum; and transmit a second request data message from the core discovery agent to itself if the input datum does not match the known datum, the second request data message including the original requested datum, the known datum, and the input datum as a new requested datum. In addition the processing element may be configured to receive the second request data message; call the resource locator to request the location of the information service that provides a value for the new requested datum; call the resource definitions database to find a definition associated with the new requested datum; return the location of the information service; call a resource façade to contact the information service; transmit a third information service message including the new requested datum from the resource façade to the information service; receive a fourth information service message from the information service including a value for the new requested datum; return the new requested datum and its value from the resource façade to the core discovery agent; and/or transmit a discovery resolution data message including the new requested datum and its value from the core discovery agent to itself. Furthermore, the processing element may be configured to translate the requested datum and the known datum into a protocol used by the information service before transmitting the first information service message from the resource façade and translate the requested datum and its value from the second information service message into a protocol used by the core discovery agent before returning the requested datum and its value to the core discovery agent.

Exemplary Software Application for Retrieving Information from a Plurality of Information Services and Providing it to a Public Application Programming Interface (API)

In yet another aspect, a software application for retrieving information from a plurality of information services and providing it to a public application programming interface (API) may be provided. The software application may comprise a core discovery agent, a resource locator, a resource definitions database, and/or a resource façade. The core discovery agent may be configured to receive messages from the public API or from itself, the messages including at least one requested datum and at least one known datum. The core discovery agent may be further configured to determine whether additional information is needed and, if so, then call another software application component, or send a request data message to itself, and if not, then transmit a resolved data message to the public API. The resource locator may be configured to receive the call from the core discovery agent, to send a query for a definition associated with the requested datum, and to return the definition information to the core discovery agent. The resource definitions database may include a definition for each of a plurality of requested datums and may be configured to receive the query from the resource locator and to provide requested datum information. The resource façade may be configured to send a request for a value for the requested datum to an information service, to receive the requested datum and its value from the information service, and to return the requested datum and its value to the core discovery agent. The software application may include additional, less, or alternate functionality, including that discussed elsewhere herein.

For instance, the resource façade may be further configured to translate the requested datum and any other datums and their values into a protocol used by the information service before sending the request to the information service. The resource façade may be further configured to translate the requested datum and its value into a protocol used by the core discovery agent after receiving the requested datum from the information service. The definition information may include at least one input datum required by the information service, and the core discovery agent may be further configured to send the request data message to itself if the input datum does not match the known datum and to call the resource façade if the input datum matches the known datum. The core discovery agent may be further configured to transmit an unresolved data message to the public API if the resource façade does not receive the requested datum and its value from the information service. The core discovery agent may be further configured to transmit an unresolved data message to the public API if the resource definitions database does not include the definition for the requested datum. The core discovery agent may be further configured to send a discovery resolution message to itself if the requested datum and its value received from the information service is not an original requested datum. The components may be computer-readable or computer-executable instructions, computer applications, and/or computer-executable instruction modules stored on non-transitory computer-readable media or medium.

Exemplary Software Architecture

The present embodiments may relate to writing rules as a decision tree composed of functions, and running them in a simulation environment for validation, and then publishing them to an operational production environment. The content may be static when shifting between environments by running or using the same set of rules/functions. Rules may be executed based upon available data, as well additional data that may be requested on demand. A larger execution may be performed across multiple decision trees composed of the business rules.

In one aspect, a software architecture that wraps the business decision trees to abstract them from the environment they are running in may be provided. The software architecture may be invoked via distributed HTTP calls in an operational environment and testware in the simulation environment. The business rules may be written once and put through various rigors of simulation or software testing until performed is verified, and after which the business rules may be published to a production environment. The architecture may provide the interface to the rules, as well as fulfill requests for additional data by the rules in order to execute the entire decision tree. The business rules may not know the source of data at run time, and requirements for fulfillment of data requests may be provided at design time.

The business rules may be written once and may be run in any environment with different data sources being provided. A specific line of business (such as auto, life, health, renters, or homeowners insurance, or mutual funds or loans), or other end user, may not know whether or not they have the data. The line of business will just ask for it, and the software architecture will ensure it is provided. The sources of the data may change based upon environment, business context, or what other data is available. The line of business may provide novel data elements directly when performing discovery activities or developing new rules, and then work with software developers on how to source the data.

The software architecture supports the saving of the decision tree state so it may be resumed after the additional data is required when necessary. This approach may be used in any business context, it may drive business processes, business models, user experiences (web or mobile), and in any part of the company. In situations where it is driving a user experience, predictive behavior models developed through analytics and data science research may provide custom experiences to users. The user experience may not need to have business context, and it may provide the data available and be driven by the software architecture.

In one aspect, the business rules may relate to financial or insurance services, and may relate to determining whether or not a customer data is available, whether a customer is eligible for certain products, services, and/or discounts, what the premium would be for a specific customer for a specific type of product or service (such as auto or homeowners insurance), what an interest rate would be for the customer for a specific type of loan (home or auto loan), etc. The software architecture may provide a data channel or envelope within or by which existing data is accessed or retrieved.

The software architecture may provide by a means by which financial and/or insurance services (such as providing quotes for auto loans or auto insurance), and other products and services, are provided or offered to customers. Other use cases of the present embodiments may include providing or determining credit scores, insurance premiums or discounts, customer address information, insurance renewals, new account or loan eligibility, etc. Additional use cases may include handling insurance claims or home appraisals.

First Exemplary Resource Discovery Agent

The intention of the resource discovery agent is to provide a means of shifting the system of knowledge contained in requirements and business analysts into a discoverable set of resources. To satisfy this goal the resource discovery agent may generate and operate on a flow of messages, satisfying message(s) until a resource (typically a business conclusion) is reached. These messages may be processed using three main subcomponents: a repository of knowledge, a resource locator, and the core discovery agent itself.

Requirements

A resource may be defined as any information that can be named: a document or image, a temporal service (e.g., "current time"), a collection of other resources, a non-virtual object (e.g., a person [such as a customer] or a premium), and so on. In other words, in modern systems, any concept that might be the target of an author's, or consumer's, reference must fit within the definition of a resource. In other words, a resource may be a conceptual mapping of data to a given set of entities.

Understanding a majority of content, such as business rules, our customers, or even a premium may all be considered a resource—one may build a means of interpreting resources and transforming them into a common language that may be analyzed and interpreted to fulfill two fundamental business requirements: analysis and resource acquisition.

Analysis

The requirements of analysis may be as follows. Business partners may need the ability to define the resource common language (a term and its definition), and to trace between internal and external resources (definition terms). Business partners may also need the ability to trace all available resources, even if they are not currently being leveraged by the larger system.

Resource Acquisition

The requirements of resource acquisition may be as follows. Business partners may need the ability to alter resources without impacting an existing resource, and to simulate a resource. Further, business partners may need the ability to manually create a resource, and/or to have myriad versions of a similar resource.

The Discovery Process

The discovery process may be driven through a recursive flow of messages. These messages may be a lean, yet stateful representation of resources being requested and additional resources potentially needed to satisfy such requests. There may be three types of these keys messages used to relay state to the rest of the system: request data message, resolved data message, and unresolved data message.

Request Data Messages

Request data messages may be inquiry type of messages received and broadcast by the resource discovery agent, may often be referred to as simply "request messages", and may be comprised of three key concepts: one or more requested resources (i.e., "what resource(s) do I want to know more about?"), zero or more payload resources (i.e., "what resource(s) do I already know about?"), and an optional request message may represent another "triggering" resource request.

Resources often require other resources in order to be derived. For example, a customer's credential may be a resource required to derive customer information, or an address resource may be necessary to derive eligibility on a household. The resources needed to derive other resources may be called input, or payload, resources. The payload resources may be a critical component of the discovery system and make up the repository of knowledge. This repository of knowledge is discussed later.

The discovery process may receive an initial request message and determine if the resource(s) may be deduced based upon the message payload. If the origin payload cannot be used to satisfy the requested resource, the resource discovery agent may broadcast a separate request message to attempt to locate the resource(s) necessary to fulfill the original requested resources(s). This recursive flow of messages orchestrated by the resource discovery agent to attempt to resolve the requested resource based upon the knowledge built into the system may be referred to as continuation.

Resolved Data Messages

Resolved data messages may be broadcast by the resource discovery agent when a resource for a corresponding request message is satisfied. This is considered a "final" broadcast for a given request message (one of two final broadcast messages). These resolved messages may be comprised of two key concepts: an origin request data message (i.e., "who asked for this resource?"), and the requested resource(s) (i.e., the results).

A given resource may contain more information than what was requested, and as such, the resolved message may only contain the information being requested. This is done to ensure resources are not exposed without being explicitly requested.

Unresolved Data Messages

Unresolved data messages are broadcast by the resource discovery agent when a resource for a corresponding request message cannot be satisfied. This is considered a "final" broadcast for a given request message (one of two final broadcast messages). These unresolved messages may be comprised of two key concepts: an origin request data message (i.e., "who asked for this resource?"), and a reason for failure (i.e., "why the resource discovery agent could not resolve the requested resource?").

An unresolved data message may be triggered for many reasons. Its purpose may be to handle myriad "error" or negative flow scenarios and force the resource discovery agent to broadcast useful information as to why the unresolvable state exists. These flows may (but don't have to) be triggered by:

- a missing resource/service facade—the resource provider (often a web service) may not be available;
- a missing resource in the repository—the repository of knowledge does not know anything about the requested resource, even if the resource is a part of the schema; and
- infinite recursion—the resource being requested may be derived from a resource it is dependent on (rare).

Rating Example

The following example is merely to illustrate the concept of the resource discovery process and may not reflect any true business decisions or work flows. A customer wishes to request a quote—or premium—for a homeowner insurance policy. The customer may enter their personal information and the address of the home for which they wish to attain a quote.

The personal information may represent a couple of resources: customer and location. When a request for "the premium resource" enters through the public API, the discovery agent may inspect the message and trigger a lookup for a resource definition. The resource definition may be a resource itself that describes everything about another resource. This may include protocols, operations, parameters and the common language binding between the underlying service and the resource understood by the system (referred commonly at data bindings).

The resource discovery agent may then inspect the resource definition and detect, using the data bindings, if the payload of the message contains the information necessary to retrieve the requested resource. In this sample, a premium may be requested, however, the resource definition may declare that the customer and/or property must first contain data for customer and location eligibility. The resource discovery agent may detect that data is missing, and trigger another request message for the missing content. The resource discovery agent may then detect through the same process that in order to determine eligibility it needs a standardized address indicator. The system of knowledge may not actually understand or use the data—it may merely be an agent of the information, serving as handler for myriad resources to satisfy the original request. This flow may be illustrated as:

>> request for premium (request data message);
>> request for eligibility (request data message);
    >> request for address standardization (request data message);
    <<retrieve standardized resource (discovery resolution data message);
>> request for eligibility (request data message);
<<retrieve eligibility resource (discovery resolution data message);
>> request for premium (request data message); and
<<retrieve premium resource (resolved data message).

Once the resource discovery agent detects that a resource may be retrieved, it may leverage a resource facade to trigger the retrieval of the resource. The resource facade may simply be a function of the system that is capable of interacting with internal and/or external resources—regardless of their underlying protocols, like a SOAP or REST based resource facades. The number of facades may grow as new protocols are defined or capabilities are added to the system.

As request messages are satisfied, the discovery agent may have two options:

First, publish a "resolved message." A resolved message is a message that may indicate to the public API (and other interested parties—such as a logging framework) that an initial request message has been completely satisfied. Resolved messages may only be published when the original request is completely satisfied. Based upon the above example, the resolved message may only be published when the "retrieve premium resource" is successfully obtained by the resource discovery agent.

Second, the discovery agent may publish another "request message." Request messages are public when there are remaining "triggering" request messages. Using the above example, the triggering request message for "request for address standardization" is the "request for eligibility" who subsequently was triggered by the "request for premium." Therefore, in the above example, request messages may be published twice for both the "request for eligibility" and "request for premium."

Conversely, when request messages cannot be satisfied the discovery agent may publish a "unresolved message." It is the job of the resource discovery agent to provide a highly descriptive message so analysts may triage the cause and potentially implement a solution. Some unresolved messages may always be unresolved, such as when the request message is requesting information unknown to the repository of knowledge.

While the resource discovery process may seem chatty with the myriad messages being broadcast, these messages may be "cheap" to construct and handled primarily by the resource discovery agent. The resource discovery agent detects if a resource may be retrieved before attempting to trigger a network or resource request, which all may occur inside of the discovery agent.

System/Repository of Knowledge

At the core of the resource discovery process may be a common language, or vocabulary, defined in a schema and understood by the discovery agent. Request messages may use this vocabulary in order to trigger resource requests—neglecting to use this common vocabulary may prevent resources from being discovered.

However, resources themselves do not and will not use this same vocabulary—it is an unrealistic (albeit ideal) expectation. This is where the repository of knowledge (often referred to as simply "the registry") comes into play. Resources may be "registered" with the repository of knowledge using standard protocol documents, such as WSDLs or WADLs. These documents may be processed and transformed into a standard and verbose format called resource definitions. The resource definitions may contain all the information necessary to retrieve the underlying resource: such as protocol (SOAP, REST, other), endpoints, input parameters (including but not limited to HTTP headers and resource dependencies), output parameters and much more.

The parameters (both input and output) are at the crux of how the resource discovery process works. Given the request driven nature of the system, the origin or continuation message may be ultimately asking for a resource. The "ask" may evaluate the repository of knowledge, inspect all the available outputs of all registered resources, and match the resource definition with the requested resource.

Resources may not naturally use the same vocabulary as the requestor. For this reason, each parameter in the resource definition for a given resource (both inputs and outputs) may contain the vocabulary of the resource itself and a binding to the vocabulary defined in the common language schema. While parameter binding may be critical to the repository of knowledge, not all parameters are required to be bound, rather only the parameters that are important to the system or required to obtain the underlying resource. Additionally, parameters may be configured with default values.

The workflow (based upon the previous example) may be summarized as:

(1) the resource discovery agent may receive a "request for premium";

(2) the resource discovery agent may leverage the repository of knowledge to glean which resource definition contains "premium" as an output parameter;

(3) the resource discovery agent may process the corresponding resource definition input bindings (the common vocabulary) to determine if the resource may be obtained based upon the current state;

(4) the resource discovery agent may bind the common vocabulary values to the input parameters of the underlying resource being requested using the resources niche vocabulary; and/or (5) the resource discovery agent may obtain the resource and bind the output parameters of the resource back into the common vocabulary—thereby satisfying the request for data and returning the values in the common schema vocabulary.

Priority

Priority of a resource may become a decision of the business that is configured as part of the resource definitions themselves. With reference to FIG. 11, take for example the following scenario where the requestor is requesting resources "a", "b", "c." This fictitious example outlines one of many runtime decisions that need to be made based upon business decision and input. As one can see, if you were to simply leverage the output parameters to determine which service to call, you would choose resource 1; however, the cost of that service is high so it is more cost effective to trigger resource 2 and 3. This isn't to say that you would never choose resource 1 (perhaps you pay more for 1 because it is more accurate or reliable and a critical part of the business flow). In this scenario, you may perhaps honor priority above cost.

In the end, the repository of knowledge may be a repository of available resources espoused with configurable meta data to drive business runtime decisions.

Messaging & Event Processing

Messages published to the resource discovery agent, such as requested, resolved and unresolved, may be critical to the flow of the resource discovery process. However, they can also be used to derive information about the state of the system—such as the availability of a resource, how many times a resource is being requested and other analytical information. Such information may be incredibly powerful in understanding how to optimize the customer experience, glean business events, and provide a foundation for myriad other business and/or system level decisions. As such, additional message handlers may be attached to the system to "log" these system level events to a data store of the consumers choice (such as a relational DB, Kafka, or any other data storage solution).

While these messages may be processed in real time, by storing them off as immutable facts in a separate storage solution it positions the business and systems to run analytics or research historical data with new hypotheses.

Performance

While performance should be the concern of all modern interfaces it does not need to be the concern of the data driven process. The data driven process may be focused on one thing and one thing alone—resource resolution. This does not imply the data driven process may not provide responsive and pleasing customer experience, rather the concern of providing such an experience should be shifted to the experience layer by leveraging the resource discovery messages.

The resource discovery agent may provide ample information via the messaging and event processing. These messages may be leveraged to generate views necessary to provide an amazing customer experience. Consider the resource discovery agent publishing 1000 request for data messages, 950 of which resolve the data, and 50 are considered unresolved (resource outage or a simple data issue). Remember that each of these internal messages may be published to an event processing queue. In processing this queue we learn that this specific request takes ~600 milliseconds. The user interface layer may access a view of timings for a given request and display an accurate progress bar or route the customer down a different flow (for excessively long runs). Additionally, the user interface may even react and position a customer for "unresolved" requests (knowing ahead of time there is a 5% chance of failure).

The underlying fact is that we may leverage the event processing to drive a better and more responsive customer experience without necessitating the need to complicate and solve for performance inside the resource discovery agent— this may include asynchronous and parallel resource discovery for a single resource request.

Asynchronous Processing

The majority of resources may follow a traditional pattern of request/response where the response is the resource being requested. However, several resources follow a more asynchronous pattern where you request the resource and retrieve a unique identifier for that request (not the resource itself). In this scenario, the requestor may have to submit subsequent requests for the actual resource using the unique identifier from the original request. This may be done when the resource itself takes some time to locate. This pattern may be considered a polling process, where the caller polls the resource provider for a given resource.

The asynchronous pattern potentially complicates the resource discovery agent in that the resource being requested isn't actually what is initially returned from the original request. Logic may be built into the system but it may stretch the core capabilities of the system—remember, the discovery agent may be about simply locating a resource. The unique identifier may not be the resource being requested, rather a "pointer" to the actual resource. This capability may be built into the repository of knowledge, but it may shift the core capabilities of the resource discovery agent and add unnecessary complexity to the system. To alleviate this issue, a new capability may be built to manage the asynchronous flows—such as establishing a new service to manage the resource identifier and "polling" process, or reaching out to the resource owner to add a new capability to the service to circumvent the asynchronous pattern.

Ultimately the resource discovery agent may be about discovering resources. The intention may be to shift conversations and requirements from a systems level of thinking to a business, or common language way of conveying information. For example, as a business we often state requirements like: "in order to determine if a risk is eligible I need to first call the address standardization service." With the resource discovery agent, requirements may shift focus from service oriented to resource oriented, such as "in order to determine if this home is eligible, I need to first make sure the address is valid." By doing this, the concern of "address standardization" may be shifted to be a concern of the system and positions business analysts to focus on defining business centered requirements. In the end, for this example, it should not matter if the address is standardized via an internal "address standardization service." Rather, what truly matters to the business may be that we have a valid address for the risk we are willing to accept or reject.

Second Exemplary Resource Discovery Agent

In yet another aspect, a resource discovery agent for providing values of datums to an application which supplies requested information to a user may be provided. The resource discovery agent may comprise a process, a rule, and a plurality of dynamically utilized interfaces. The process may be configured to implement a function and acquire values of datums that are provided to the application. The rule may be applied by the process and configured to require that a condition be met. The interfaces may include a first interface configured to send a first request to a first service to receive a value of a first datum and provide a value of a second datum to the first service as an input, and a second interface which is utilized if the value of the second datum is not known before the first interface is utilized, the second interface configured to send a second request to a second service to receive a value of the second datum and provide a value of a third datum to the second service as an input. The resource discovery agent may include additional, fewer, or alternate components and/or functionality, including that discussed elsewhere herein.

For instance, the process may be further configured to acquire values of intermediate datums, which include the values needed to acquire the values of datums that are provided to the application. A portion of the values of the intermediate datums may be received from the user. At least one interface may be utilized to request a portion of the values of the intermediate datums from at least one service. The value of the second datum or the third datum may be received from the user. The value of the third datum may be received from a third service. The condition to be met may include a minimum age of the user. The condition to be met may include a valid home address of the user.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

We claim:

1. A computer-implemented method for retrieving information from a plurality of information services and providing it to a public application programming interface (API), the computer-implemented method comprising, via one or more processors and/or transceivers:
   receiving a first request data message using a core discovery agent, the first request data message including at least one requested datum, for which a value is sought, and at least one known datum, for which a value is known;
   calling a resource locator to request a location of an information service that provides a value for the requested datum;
   calling a resource definitions database to find a definition associated with the requested datum, wherein the definition includes the location of the information service and one or more input datums required by the information service in order to provide values for the requested datum;
   returning the location of the information service and at least one input datum of the one or more input datums if the resource definitions database includes the definition associated with the requested datum;
   transmitting a second request data message from the core discovery agent to itself if the input datum does not match the known datum, the second request data message including the original requested datum, the known datum, and the input datum as a new requested datum;
   calling a resource façade to contact the information service if the input datum matches the known datum;
   transmitting a first information service message including the requested datum and the known datum from the resource facade to the information service;
   receiving a second information service message from the information service including a value for the requested datum;
   returning the requested datum and its value from the resource facade to the core discovery agent; and
   transmitting a resolved data message including the requested datum and its value from the core discovery agent to the public API.

2. The computer-implemented method of claim 1, further comprising transmitting an unresolved data message from the core discovery agent to the public API if the resource definitions database does not include a definition for the requested datum, wherein the unresolved data message includes a reason why a value could not be found for the requested datum.

3. The computer-implemented method of claim 1, further comprising transmitting an unresolved data message from the core discovery agent to the public API if the resource facade cannot contact the information service or if the information service does not return a value for the requested datum, wherein the unresolved data message includes a reason why a value could not be found for the requested datum.

4. The computer-implemented method of claim 1, further comprising, via the one or more processors and/or transceivers: receiving the second request data message; calling the resource locator to request the location of the information service that provides a value for the new requested datum; calling the resource definitions database to find a definition associated with the new requested datum; returning the location of the information service; calling a resource facade to contact the information service; transmitting a third information service message including the new requested datum from the resource facade to the information service; receiving a fourth information service message from the information service including a value for the new requested datum; returning the new requested datum and its value from the resource facade to the core discovery agent; and transmitting a discovery resolution data message including the new requested datum and its value from the core discovery agent to itself.

5. The computer-implemented method of claim 1, further comprising translating the requested datum and the known datum into a protocol used by the information service before transmitting the first information service message from the resource facade.

6. The computer-implemented method of claim 1, further comprising translating the requested datum and its value from the second information service message into a protocol used by the core discovery agent before returning the requested datum and its value to the core discovery agent.

7. A computer-implemented method for retrieving information from a plurality of information services and providing it to a public application programming interface (API), the computer-implemented method comprising, via one or more processors and/or transceivers:
  receiving a first request data message using a core discovery agent, the first request data message including at least one requested datum, for which a value is sought, and at least one known datum, for which a value is known;
  calling a resource locator to request a location of an information service that provides a value for the requested datum;
  calling a resource definitions database to find a definition associated with the requested datum, wherein the definition includes the location of the information service and one or more input datums required by the information service in order to provide values for the requested datum;
  returning the location of the information service and at least one input datum of the one or more input datums if the resource definitions database includes the definition associated with the requested datum;
  transmitting a second request data message from the core discovery agent to itself if the input datum does not match the known datum, the second request data message including the original requested datum, the known datum, and the input datum as a new requested datum;
  calling a resource facade to contact the information service if the input datum matches the known datum;
  translating the requested datum and the known datum into a protocol used by the information service;
  transmitting a first information service message including translations of the requested datum and the known datum from the resource facade to the information service; receiving a second information service message from the information service including a value for the requested datum;
  translating the requested datum and its value from the second information service message into a protocol used by the core discovery agent;
  returning the requested datum and its value from the resource facade to the core discovery agent; and
  transmitting a resolved data message including the requested datum and its value from the core discovery agent to the public API.

8. The computer-implemented method of claim 7, further comprising transmitting an unresolved data message from the core discovery agent to the public API if the resource definitions database does not include a definition for the requested datum, wherein the unresolved data message includes a reason why a value could not be found for the requested datum.

9. The computer-implemented method of claim 7, further comprising transmitting an unresolved data message from the core discovery agent to the public API if the resource facade cannot contact the information service or if the information service does not return a value for the requested datum, wherein the unresolved data message includes a reason why a value could not be found for the requested datum.

10. The computer-implemented method of claim 7, further comprising, via the one or more processors and/or transceivers:
  receiving the second request data message;
  calling the resource locator to request the location of the information service that provides a value for the new requested datum;
  calling the resource definitions database to find a definition associated with the new requested datum;
  returning the location of the information service;
  calling a resource facade to contact the information service;
  transmitting a third information service message including the new requested datum from the resource facade to the information service;
  receiving a fourth information service message from the information service including a value for the new requested datum;
  returning the new requested datum and its value from the resource facade to the core discovery agent; and
  transmitting a discovery resolution data message including the new requested datum and its value from the core discovery agent to itself.

11. A computing device for retrieving information from a plurality of information services and providing it to a public application programming interface (API), the computing device comprising:
  a communication element configured to provide electronic communication with a communication network;
  a processing element in electronic communication with the communication element and a memory element, the processing element configured to:
    receive a first request data message using a core discovery agent, the first request data message including at least one requested datum, for which a value is sought, and at least one known datum, for which a value is known,
    call a resource locator to request a location of an information service that provides a value for the requested datum, call a resource definitions database to find a definition associated with the requested datum, wherein the definition includes the location of the information service and one or more input datums required by the information service in order to provide values for the requested datum,
    return the location of the information service and at least one input datum of the one or more input datums if the resource definitions database includes the definition associated with the requested datum, transmit a second request data message from the core discovery agent to itself if the input datum does not match the known datum, the second request data message including the original requested datum, the known datum, and the input datum as a new requested datum;

call a resource facade to contact the information service if the input datum matches the known datum, transmit a first information service message including the requested datum and the known datum from the resource facade to the information service, receive a second information service message from the information service including a value for the first requested datum, return the requested datum and its value from the resource facade to the core discovery agent, and transmit a resolved data message including the requested datum and its value from the core discovery agent to the public API.

12. The computing device of claim 11, wherein the processing element is further configured to transmit an unresolved data message from the core discovery agent to the public API if the resource definitions database does not include a definition for the requested datum, wherein the unresolved data message includes a reason why a value could not be found for the requested datum.

13. The computing device of claim 11, wherein the processing element is further configured to transmit an unresolved data message from the core discovery agent to the public API if the resource facade cannot contact the information service or if the information service does not return a value for the requested datum, wherein the unresolved data message includes a reason why a value could not be found for the requested datum.

14. The computing device of claim 11, wherein the processing element is further configured to:

receive the second request data message, call the resource locator to request the location of the information service that provides a value for the new requested datum, call the resource definitions database to find a definition associated with the new requested datum, return the location of the information service, call a resource facade to contact the information service, transmit a third information service message including the new requested datum from the resource facade to the information service, receive a fourth information service message from the information service including a value for the new requested datum, return the new requested datum and its value from the resource facade to the core discovery agent, and transmit a discovery resolution data message including the new requested datum and its value from the core discovery agent to itself.

15. The computing device of claim 11, wherein the processing element is further configured to translate the requested datum and the known datum into a protocol used by the information service before transmitting the first information service message from the resource facade.

16. The computing device of claim 11, wherein the processing element is further configured to translate the requested datum and its value from the second information service message into a protocol used by the core discovery agent before returning the requested datum and its value to the core discovery agent.

17. The computer-implemented method of claim 1, wherein the definition further includes a format or protocol for the requested datums and the input datum required by the information service, wherein calling the resource façade to contact the information service if the input datum matches the known datum includes calling the resource façade to translate the requested datums and the known datums into the format or protocol identified in the definition.

18. The computer-implemented method of claim 7, wherein the definition further includes a format or protocol for the requested datums and the input datum required by the information service, wherein calling the resource façade to contact the information service if the input datum matches the known datum includes calling the resource façade to translate the requested datums and the known datums into the format or protocol identified in the definition.

19. The computing device of claim 11, wherein the definition further includes a format or protocol for the requested datums and the input datum required by the information service, wherein calling the resource façade to contact the information service if the input datum matches the known datum includes calling the resource façade to translate the requested datums and the known datums into the format or protocol identified in the definition.

* * * * *